(12) United States Patent
Yang et al.

(10) Patent No.: US 12,732,668 B2
(45) **Date of Patent: *Sep. 8, 2026**

(54) TERMINAL AND SERVER FOR INTERACTIONS BETWEEN A STREAMER AND A USER RESPONSIVE TO A GIFT

(71) Applicant: 17LIVE Japan Inc., Tokyo (JP)

(72) Inventors: Yu-Shan Yang, Taipei City (TW); Yung-Chi Hsu, Taipei City (TW); Sheng-Kai Hsu, Taipei City (TW); Ching-Jan Wang, Taipei City (TW); Yun-An Lin, Taipei City (TW)

(73) Assignee: 17LIVE Japan Inc., Tokyo (JP)

( * ) Notice: Subject to any disclaimer, the term of this patent is extended or adjusted under 35 U.S.C. 154(b) by 80 days.

This patent is subject to a terminal disclaimer.

(21) Appl. No.: 18/921,827

(22) Filed: Oct. 21, 2024

(65) Prior Publication Data

US 2025/0047948 A1 Feb. 6, 2025

Related U.S. Application Data

(63) Continuation of application No. 18/306,052, filed on Apr. 24, 2023, now Pat. No. 12,155,902.

(30) Foreign Application Priority Data

May 26, 2022 (JP) ................................ 2022-086444
Aug. 5, 2022 (JP) ................................ 2022-125308

(51) Int. Cl.
*H04N 21/2187* (2011.01)
*H04N 21/472* (2011.01)
(Continued)

(52) U.S. Cl.
CPC ..... *H04N 21/4788* (2013.01); *H04N 21/2187* (2013.01)

(58) Field of Classification Search
CPC ........ A63F 13/355; A63F 13/44; A63F 13/45; A63F 13/69; A63F 13/86; A63F 13/87;
(Continued)

(56) References Cited

U.S. PATENT DOCUMENTS

2015/0379492 A1 12/2015 Bluvband
2019/0182554 A1* 6/2019 Schupak ............ H04N 21/4316
(Continued)

OTHER PUBLICATIONS

Notification of Reasons for Refusal dated Nov. 8, 2022, issued in corresponding Japanese Patent Application No. 2022-125308 with English translation (8 pgs.).
(Continued)

*Primary Examiner* — Nicholas R Taylor
*Assistant Examiner* — Ho T Shiu
(74) *Attorney, Agent, or Firm* — CUSHMAN PARTNERS LLC

(57) ABSTRACT

Interaction is created between users and streamers even when the users give gifts to the streamers outside live-streams.

Provided is a terminal of a user, which includes: one or more processors; and memory storing one or more computer programs configured to be executed by the one or more processors. The one or more computer programs include instructions for: receiving, from the user, an instruction to use a gift for a streamer while the user is not participating in a live-stream of the streamer; and causing an output unit to output an effect corresponding to the use of the gift by the user while the streamer is live-streaming.

14 Claims, 18 Drawing Sheets

(51) Int. Cl.
*H04N 21/4784* (2011.01)
*H04N 21/4788* (2011.01)

(58) Field of Classification Search
CPC ... H04N 21/2187; H04N 21/431; H04N 21/45
See application file for complete search history.

(56) References Cited

U.S. PATENT DOCUMENTS

| | | | | |
|---|---|---|---|---|
| 2020/0302734 | A1 | 9/2020 | Baker | |
| 2021/0402294 | A1 | 12/2021 | Kanaya | |
| 2022/0159315 | A1* | 5/2022 | Liang ................. | G06Q 30/0208 |
| 2023/0042609 | A1* | 2/2023 | Zhang ................ | H04N 21/4312 |

OTHER PUBLICATIONS

VR Animation Production/Distribution Tool, "AniCast", added function to make creations appear in VR, [online], Japan Mogura Inc., Apr. 5, 2018, http://wwwmoguravr.com/anicast-vr-2 (searched Oct. 28, 1992), with English machine translation (20 pgs.).

Reddit, "Will a streamer see my message if I cheer while they are offline?", 2018, https://www.reddit.com/r/Twitch/comments/ 9gzx18/ will_a_streamer_see_my _message_if_i_cheer _while/?rdt=44236 (Year: 2018).

* cited by examiner

| Stream ID | Streamer ID | Viewer ID |
|---|---|---|
| ST22 | S005 | SS5, SS12, SS43 |
| ST92 | 002B | TT3,TS2 |
| | | |

| User ID | Points | Reward |
|---|---|---|
| S005 | 3243 | 1500 |
| ABCFO | 2510 | 800 |
| SS5 | 1803 | 0 |
| TT3 | 1305 | 0 |
| | | |

| Gift ID | Reward to be Awarded | Price Points | Type |
|---|---|---|---|
| TT01 | 90 | 100 | In-Stream |
| TE01 | 180 | 200 | In-Stream |
| S100 | 90 | 100 | Out-Of-Stream |
| S500 | 480 | 500 | Out-Of-Stream |
| S1000 | 900 | 1000 | Both |
| VV500 | 480 | 500 | Both |

| Recipient User ID | Giver User ID | Time | Gift ID | Price Points |
|---|---|---|---|---|
| S005 | SS5 | 2022/7/24 12:34 | S4000 | 4000 |
| 002B | TT3 | 2022/7/23 5:23 | S500 | 500 |
| S005 | SS5 | 2022/7/22 14:00 | S500 | 500 |
| ABCFO | SS1 | 2022/7/21 9:14 | S1000 | 1000 |
| S005 | SS43 | 2022/7/20 22:32 | S100 | 100 |

| Rank | Giver User ID | Total Price Points |
|---|---|---|
| 1 | S005 | 4500 |
| 2 | SS59 | 3500 |
| 3 | SS43 | 3200 |
| | | |

| Giver User ID | Total Price Points |
|---|---|
| SS39 | 1200 |
| SS43 | 3500 |
| SS5 | 4500 |
| | |

Fig. 18
Out-Of-Stream Gift Ranking
① SS5 4500pt
② SS59 3500pt
③ SS43 3200pt
④ SS78 2800pt
Top 3 Of Total Ranking
① SS23 15040pt
② SS74 13240pt
③ SS5 10404pt
654

TERMINAL AND SERVER FOR INTERACTIONS BETWEEN A STREAMER AND A USER RESPONSIVE TO A GIFT

CROSS-REFERENCE TO RELATED APPLICATIONS

This application is a Continuation application of U.S. Ser. No. 18/306,052, filed on Apr. 24, 2023, which is based on and claims the benefit of priority from Japanese Patent Applications Serial Nos. 2022-086444 (filed on May 26, 2022), and 2022-125308 (filed on Aug. 5, 2022), the contents of each of which are hereby incorporated by reference in their entirety.

TECHNICAL FIELD

The present disclosure relates to a terminal and a server.

BACKGROUND

With the development of IT technology, the way information is exchanged has changed. In the Showa period (1926-1989), one-way information communication via newspapers and television was the main stream. In the Heisei period (1990-2019), with the widespread availability of cell phones and personal computers, and the significant improvement in Internet communication speed, instantaneous interactive communication services such as chat services emerged, and on-demand video streaming services also become popular as storage costs were reduced. And nowadays or in the Reiwa period (2019 to present), with the sophistication of smartphones and further improvements in network speed as typified by 5G, services that enable real-time communication through video, especially live-streaming services, are gaining recognition. The number of users of live-streaming services is expanding, especially among young people, as such services allow people to share the same good time even when they are in the separate locations from each other.

Gifts, such as tips (Nagesen), play a key role in making live-streams exciting and constitute an important source of income for live-streamers. Japanese Patent Application Publication No. 2020-017870 describes a technique to make a live-stream more exciting by showing a Nagesen (tipping) effect with which a donation from a viewer to a live-streamer is shown on the live-stream screen.

In general, if a viewer gives a gift to a streamer within a live-stream, the streamer can know who gives what real time by referring to an effect and a comment. Thus, the live-streamer can immediately thank the viewer, show performance or respond in any other ways. Such responses can be witnessed by everyone participating in the live-stream. This has been established as one of the ways of communication live-streams provide for between streamers and viewers.

If a viewer gives a gift to a streamer outside a live-stream, on the other hand, the streamer gives no response to the viewer, or, if any, only posts an automatic comment on the timeline. Such responses can hardly satisfy the viewer who has given the gift.

SUMMARY

In view of the above, one object of the disclosure is to provide a technology that can bring about interactions between a streamer and a user who gives a gift to the streamer outside a live-stream.

One aspect of the disclosure relates to a terminal of a user. The terminal includes one or more processors; and memory storing one or more computer programs configured to be executed by the one or more processors. The one or more computer programs include instructions for: receiving, from the user, an instruction to use a gift for a streamer while the user is not participating in a live-stream of the streamer; and causing an output unit to output an effect corresponding to the use of the gift by the user while the streamer is live-streaming.

Another aspect of the disclosure also relates to a terminal of a streamer of a live-stream. The terminal includes: one or more processors; and memory storing one or more computer programs configured to be executed by the one or more processors. The one or more computer programs include instructions for: showing an object on a display during the live-stream of the streamer, the object corresponding to use of a gift for the streamer by a user while the user is not participating in the live-stream of the streamer.

A further another aspect of the present disclosure relates to a server. The server includes: a holding unit for holding information regarding a gift used by a user for a streamer while the user is not participating in a live-stream of the streamer; a receiving unit for receiving, from a terminal of the user over a network, a request made by the user to join the live-stream of the streamer; and a determining unit for, upon reception of the request, referring to the holding unit to determine whether to have an effect output, the effect corresponding to the use of the gift by the user.

It should be noted that the components described throughout this disclosure may be interchanged or combined. The components, features, and expressions described above may be replaced by devices, methods, systems, computer programs, recording media containing computer programs, etc. Any such modifications are intended to be included within the spirit and scope of the present disclosure.

BRIEF DESCRIPTION OF THE DRAWINGS

FIG. 4 is a data structure diagram showing an example of a stream DB in FIG. 3.

FIG. 5 is a data structure diagram showing an example of a user DB in FIG. 3.

FIG. 6 is a data structure diagram showing an example of a gift DB in FIG. 3.

FIG. 7 is a data structure diagram showing an example of an out-of-stream gift history DB in FIG. 3.

FIG. 8 is a data structure diagram showing an example of an out-of-stream gift ranking DB in FIG. 3.

FIG. 9 is a data structure diagram showing an example of an out-of-stream gift total table in FIG. 3.

DESCRIPTION OF THE PREFERRED EMBODIMENTS

Like elements, components, processes, and signals throughout the figures are labeled with same or similar designations and numbering, and the description for the like elements will not be hereunder repeated. For purposes of clarity and brevity, some of the components that are less related and thus not described are not shown in the figures.

A live-streaming system relating to an embodiment of the disclosure allows users to give gifts to other users without participating in live-streams. For example, users can send gifts to their favorite streamers even while the streamers are not live-streaming. Hereinafter, the term "in-stream gift" refers to a gift given by a user to a streamer within a live-stream of the streamer or while the user is participating in the live-stream, and the term "out-of-stream gift" denotes a gift given by a user to a streamer outside a live-stream of the streamer or while the user is not participating in the live-stream. In other words, out-of-stream gifts can be any gifts other than in-stream gifts.

At any timing after a user gives an out-of-stream gift to a streamer, the streamer may start live-streaming. The user who has given the out-of-stream gift may also join the live-stream. In the live streaming system relating to the embodiment, when the user who has given the out-of-stream gift joins the live-stream, an effect indicating the usage of the out-of-stream gift appears on the screen of the live-stream. This can make the user who has given the out-of-stream gift feel special and tell the streamer that the user who has given the out-of-stream gift to the streamer has participated in the live-stream. The streamer can thus thank the user for the out-of-stream gift again within the live-stream. This in turn encourages users to use out-of-stream gifts, strengthening the connection between users and streamers through live-streams.

Figure 1:
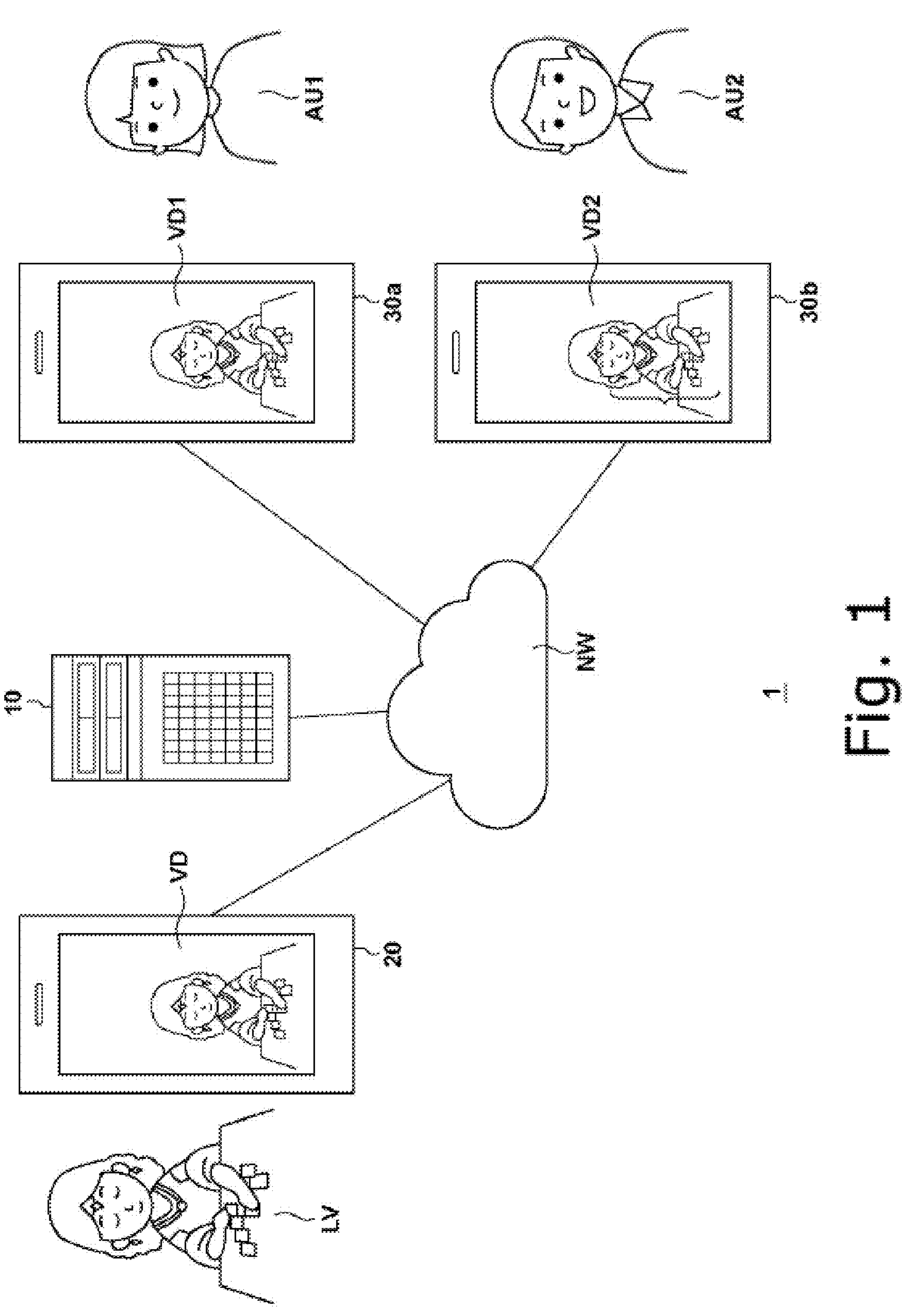
FIG. 1 schematically illustrates a configuration of a live-streaming system in one embodiment of the disclosure.

FIG. 1 schematically illustrates the configuration of a live-streaming system 1 according one embodiment of the disclosure. The live-streaming system 1 provides an interactive live-streaming service that allows a streamer LV (also referred to as a liver or distributor) and a viewer AU (also referred to as audience) (AU1, AU2, . . . ) to communicate in real time. As shown in FIG. 1, the live-streaming system 1 includes a server 10, a user terminal 20 on the streamer side, and user terminals 30 (30*a*, 30*b*, . . . ) on the audience side. The streamer and viewers may be collectively referred to as users. In addition to the streamer who is live-streaming and the viewers who watch the live-stream, there may be users who have logged in the live-streaming platform but is neither live-streaming nor watching the live-stream. Such users are referred to as active users. As used herein, users who receive out-of-stream gifts may also be referred to as streamers. This is because such users live-stream all the time and are thus expected to live-stream at any timing after receiving out-of-stream gifts.

The server 10 may be one or more information processing devices connected to a network NW. The user terminals 20 and 30 may be, for example, mobile terminal devices such as smartphones, tablets, laptop PCs, recorders, portable gaming devices, and wearable devices, or may be stationary devices such as desktop Pcs. The server 10, the user terminal 20, and the user terminals 30 are interconnected so as to be able to communicate with each other over the various wired or wireless network NW.

The live-streaming system 1 involves the streamer LV, the viewers AU, and an administrator (not shown) who manages the server 10. The streamer LV is a person who broadcasts contents in real time by recording the contents with his/her user terminal 20 and uploading them directly to the server 1. Examples of the contents may include the streamer's own songs, talks, performances, fortune-telling, gameplays, and any other contents. The administrator provides a platform for live-streaming contents on the server 10, and also mediates or manages real-time interactions between the streamer LV and the viewers AU. The viewers AU access the platform at their user terminals 30 to select and view a desired content. During live-streaming of the selected content, the viewer AU performs operations to comment, cheer, or ask fortune-telling via the user terminal 30, the streamer LV who is delivering the content responds to such a comment, cheer, or request and such response is transmitted to the viewer AU via video and/or audio, thereby establishing an interactive communication.

As used herein, the term "live-streaming" or "live-stream" may mean a mode of data transmission that allows a content recorded at the user terminal 20 of the streamer LV to be played and viewed at the user terminals 30 of the viewers AU substantially in real time, or it may mean a live broadcast realized by such a mode of transmission. The live-streaming may be achieved using existing live-streaming technologies such as HTTP Live Streaming, Common Media Application Format, Web Real-Time Communications, Real-Time Messaging Protocol and MPEG DASH. The live-streaming includes a transmission mode in which, while the streamer LV is recording contents, the viewers AU can view the contents with a certain delay. The delay is acceptable as long as interaction between the streamer LV and the viewers AU can be at least established. Note that the live-streaming is distinguished from so-called on-demand type transmission, in which contents are entirely recorded and the entire data is once stored on the server, and the server provides users with the data at any subsequent time upon request from the users.

The term "video data" herein refers to data that includes image data (also referred to as moving image data) generated using an image capturing function of the user terminals 20 and 30 and audio data generated using an audio input function of the user terminals 20 and 30. Video data is played back on the user terminals 20 and 30, so that the users can view contents. In this embodiment, it is assumed that between video data generation at the streamer's user terminal and video data reproduction at the viewer's user terminal, processing is performed onto the video data to change its format, size, or specifications of the data, such as compression, decompression, encoding, decoding, or transcoding. However, such processing does not substantially change the content (e.g., video images and audios) represented by the video data, so that the video data after such processing is herein described as the same as the video data before such processing. In other words, when video data is generated at the streamer's user terminal and then played back at the viewer's user terminal via the server 10, the video data generated at the streamer's user terminal, the video data that passes through the server 10, and the video data received and reproduced at the viewer's user terminal are all the same video data.

In the example in FIG. 1, the streamer LV is live-streaming his/her talk. The user terminal 20 of the streamer LV generates video data by recording images and sounds of the streamer LV who is talking, and the generated data is transmitted to the server 10 over the network NW. At the same time, the user terminal 20 displays the recorded video image VD of the streamer LV on the display of the user terminal 20 to allow the streamer LV to check what is to be live-streamed.

The user terminals 30*a* and 30*b* of the viewers AU1 and AU2 respectively, who have requested the platform to enable them to view the live-stream of the streamer LV, receive video data related to the live-stream over the network NW and reproduce the received video data, to display video images VD1 and VD2 on the displays and output audio through the speakers. The video images VD1 and VD2 displayed at the user terminals 30*a* and 30*b*, respectively, are substantially the same as the video image VD captured by the user terminal 20 of the streamer LV, and the audio outputted at the user terminals 30*a* and 30*b* is substantially the same as the audio recorded by the user terminal 20 of the streamer LV.

Recording of the images and sounds at the user terminal 20 of the streamer LV and reproduction of the video data at the user terminals 30*a* and 30*b* of the viewers AU1 and AU2 are performed substantially simultaneously. The viewer AU1 may type a comment about the talk of the streamer LV on the user terminal 30*a*, and the server 10 may display the comment on the user terminal 20 of the streamer LV in real time and also display the comment on the user terminals 30*a* and 30*b* of the viewers AU1 and AU2, respectively. The streamer LV may read the comment and develop his/her talk to cover and respond the comment, and the video and sound of the talk are displayed on the user terminals 30*a* and 30*b* of the viewers AU1 and AU2, respectively. This interactive action is recognized as establishment of a conversation between the streamer LV and the viewer AU1. In this way, the live-streaming system 1 realizes the live-streaming that enables the interactive communication, not one-way communication.

Figure 2:
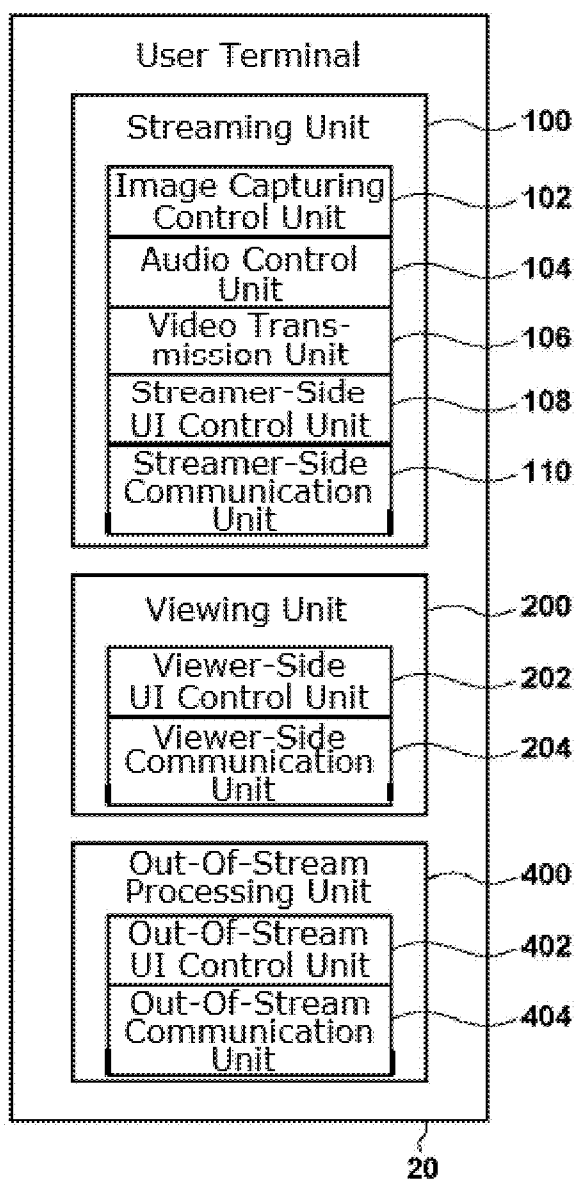
FIG. 2 is a block diagram showing functions and configuration of a user terminal shown in FIG. 1.

FIG. 2 is a block diagram showing functions and configuration of the user terminal 20 of FIG. 1. The user terminals 30 have the same functions and configuration as the user terminal 20. The blocks in FIG. 2 and the subsequent block diagrams may be realized by elements such as a computer CPU or a mechanical device in terms of hardware, and can be realized by a computer program or the like in terms of software. The blocks shown in the drawings are, however, functional blocks realized by cooperative operation between hardware and software. Therefore, it is understood by those skilled in the art that these functional blocks can be realized in various forms by combining hardware and software.

The streamer LV and the viewers AU download and install a live-streaming application program (hereinafter referred to as a live-streaming application), onto the user terminals 20 and 30 from a download site over the network NW. Alternatively, the live-streaming application may be pre-installed on the user terminals 20 and 30. When the live-streaming application is executed on the user terminals 20 and 30, the user terminals 20 and 30 communicate with the server 10 over the network NW to implement various functions. Hereinafter, the functions implemented by (processors such as CPUs of) the user terminals 20 and 30 by running the live-streaming application will be described as functions of the user terminals 20 and 30. These functions are realized in practice by the live-streaming application on the user terminals 20 and 30. In any other embodiments, these functions may be realized by a computer program that is written in a programming language such as HTML (HyperText Markup Language), transmitted from the server 10 to web browsers of the user terminals 20 and 30 over the network NW, and executed by the web browsers.

The user terminal 20 includes a streaming unit 100 for recording the user's image and sound to generate and provide video data to the server 10, a viewing unit 200 for acquiring and reproduce the video data from the server 10, and an out-of-stream processing unit 400 for processing requests made by active users. The user activates the streaming unit 100 to live-stream, the viewing unit 200 to view a live-stream, and the out-of-stream processing unit 400 to look for a live-stream, view a streamer's profile, or watch an archive. The user terminal having the streaming unit 100 activated is the streamer's terminal, i.e., the user terminal that generates video data, the user terminal having the viewing unit 200 activated is the viewer's terminal, i.e., the user terminal that reproduces video data, and the user terminal having the out-of-stream processing unit 400 activated is the active user's terminal. The out-of-stream processing unit 400 works cooperatively with the out-of-stream gift processing unit 308 of server 10 to perform processing related to out-of-stream gifts.

The streaming unit 100 includes an image capturing control unit 102, an audio control unit 104, a video transmission unit 106, a streamer-side UI control unit 108, and a streamer-side communication unit 110. The image capturing control unit 102 is connected to a camera (not shown in FIG. 2) and controls image capturing performed by the camera. The image capturing control unit 102 obtains image data from the camera. The audio control unit 104 is connected to a microphone (not shown in FIG. 2) and controls audio input from the microphone. The audio control unit 104 obtains audio data through the microphone. The video transmission unit 106 transmits video data including the image data obtained by the image capturing control unit 102 and the audio data obtained by the audio control unit 104 to the server 10 over the network NW. The video data is transmitted by the video transmission unit 106 in real time. That is, the generation of the video data by the image capturing control unit 102 and the audio control unit 104, and the transmission of the generated video data by the video transmission unit 106 are performed substantially at the same time.

The streamer-side UI control unit 108 controls an UI for the streamer. The streamer-side UI control unit 108 is connected to a display (not shown in FIG. 2), and displays a video on the display by reproducing the video data that is to be transmitted by the video transmission unit 106. The streamer-side UI control unit 108 is also connected to input means (not shown in FIG. 2) such as touch panels, keyboards, and displays, and obtains the streamer's input via the input means. The streamer-side UI control unit 108 superimposes a predetermined frame image on the video image. The frame image includes various user interface objects (hereinafter simply referred to as "objects") for accepting inputs from the streamer, comments entered by the viewers, effects corresponding to gifts, and information retrieved from the server 10. The streamer-side UI control unit 108 accepts, for example, the streamer's inputs made by the streamer tapping the objects.

The streamer-side communication unit 110 controls communication with the server 10 during a live-stream. The streamer-side communication unit 110 transmits the content of the streamer's input that has been obtained by the streamer-side UI control unit 108 to the server 10 over the network NW. The streamer-side communication unit 110 receives various information associated with the live-stream from the server 10 over the network NW.

The viewing unit 200 includes a viewer-side UI control unit 202 and a viewer-side communication unit 204. The viewer-side communication unit 204 controls communication with the server 10 during a live-stream. The viewer-side communication unit 204 receives, from the server 10 over the network NW, video data related to the live-stream in which the streamer and the viewer participate.

The viewer-side UI control unit 202 controls the UI for the viewer. The viewer-side UI control unit 202 is connected to a display and a speaker (not shown in FIG. 2), and reproduces the received video data so that video images are displayed on the display and sounds are output through the speaker. The state where the images and sounds are respectively output through the display and speaker can be referred to as "the video data is reproduced". The viewer-side UI control unit 202 is also connected to input means (not shown in FIG. 2) such as touch panels, keyboards, and displays, and obtains viewer's input via the input means. The viewer-side UI control unit 202 superimposes a predetermined frame image on an image generated from the video data obtained from the server 10. The frame image includes various objects for accepting inputs from the viewer, comments entered by the viewer, effects corresponding to gifts, and information retrieved from the server 10. The viewer-side communication unit 204 transmits the content of the viewer's input that has been obtained by the viewer-side UI control unit 202 to the server 10 over the network NW.

The out-of-stream processing unit 400 includes an out-of-stream UI control unit 402 and an out-of-stream communication unit 404. The out-of-stream UI control unit 402 controls an UI for the active user. For example, the out-of-stream UI control unit 402 generates a live-stream selection screen and shows the screen on the display. The live-stream selection screen presents a list of live-streams to which the active user is currently invited to participate to allow the active user to select a live stream. The out-of-stream UI control unit 402 generates a profile screen for any user and shows the screen on the display. The out-of-stream UI control unit 402 plays back an archived past live-stream, which is recorded and stored.

The out-of-stream communication unit 404 controls communication with the server 10 that takes place outside a live-stream. The out-of-stream communication unit 404 receives, from the server 10 over the network NW, information necessary to generate the live-stream selection screen, information necessary to generate the profile screen, and archived data. The out-of-stream communication unit 404 transmits the content of the active user's input to the server 10 over the network NW.

Figure 3:
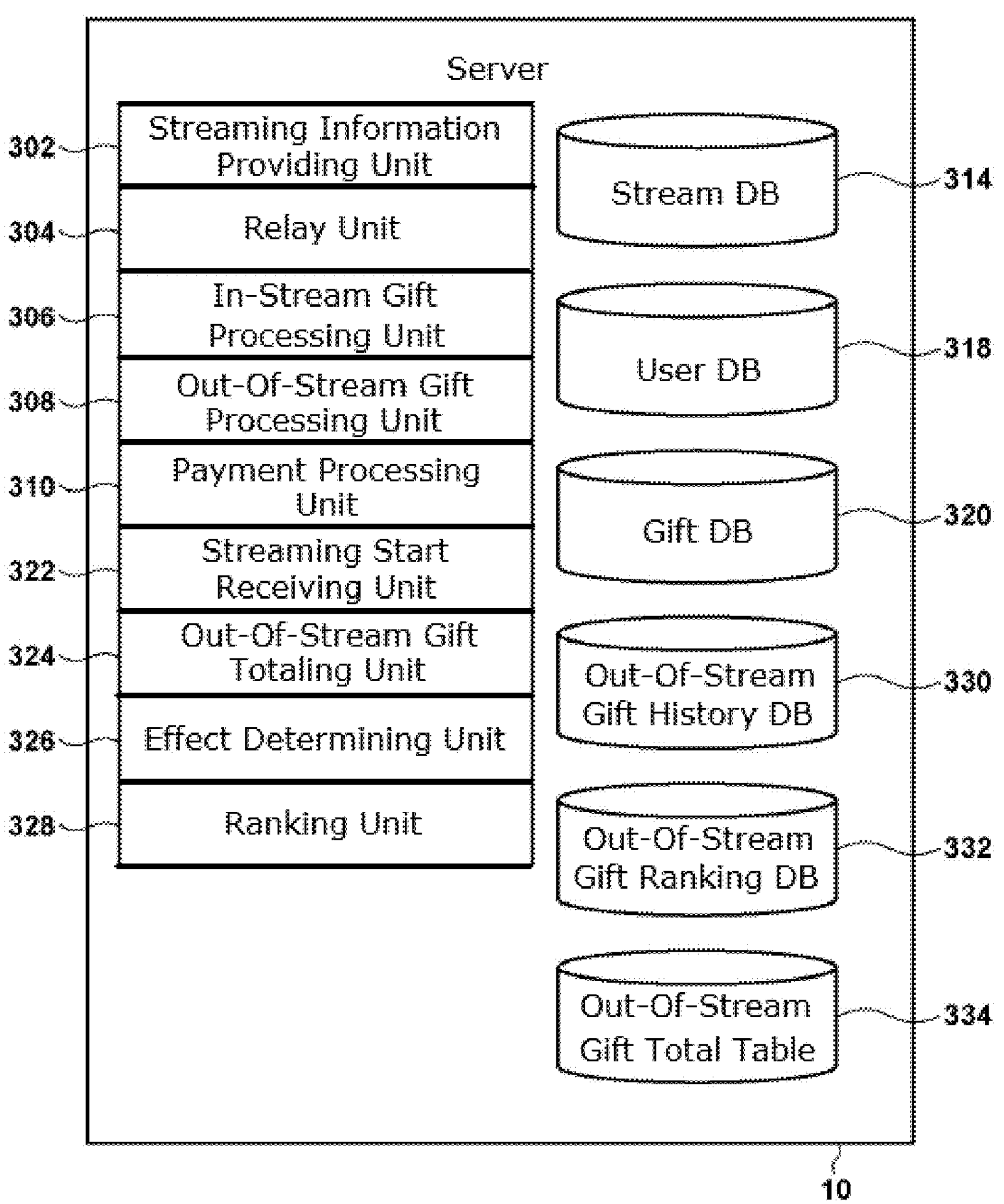
FIG. 3 is a block diagram showing functions and configuration of a server shown in FIG. 1.

FIG. 3 is a block diagram showing functions and configuration of the server 10 of FIG. 1. The server 10 includes a streaming information providing unit 302, a relay unit 304, an in-stream gift processing unit 306, an out-of-stream gift processing unit 308, a payment processing unit 310, a streaming start receiving unit 322, an out-of-stream gift totaling unit 324, an effect determining unit 326, a ranking unit 328, a stream DB 314, a user DB 318, a gift DB 320, an out-of-stream gift history DB 330, an out-of-stream gift ranking DB 332, and an out-of-stream gift total table 334.

FIG. 4 is a data structure diagram showing an example of the stream DB 314 of FIG. 3. The stream DB 314 holds information regarding live-streams currently taking place. The stream DB 314 stores a stream ID identifying a live-stream on a live streaming platform provided by the live-streaming system 1, a streamer ID, which is a user ID identifying the streamer who provides the live-stream, and a viewer ID, which is a user ID identifying a viewer of the live-stream, in association with each other.

In the live-streaming platform provided by the live-streaming system 1 of the embodiment, when a user live-streams, the user is referred to as a streamer, and when the same user views a live-stream distributed by another user, the user is referred to as a viewer. Therefore, the distinction between a streamer and a viewer is not fixed, and a user ID registered as a streamer ID at one time may be registered as a viewer ID at another time.

FIG. 5 is a data structure diagram showing an example of the user DB 318 of FIG. 3. The user DB 318 holds information regarding users. The user DB 318 stores a user ID identifying a user, points owned by the user, and the reward awarded to the user, in association with each other. The points are an electronic representation of value circulated in the live-streaming platform. The user can purchase the points using a credit card or other means of payment. The reward is an electronic representation of value defined in the live-streaming platform and is used to determine the amount of money the streamer receives from the administrator of the live-streaming platform. In the live-streaming platform, when a viewer gives a gift to a streamer within or outside a live-stream, the viewer's points are consumed and, at the same time, the streamer's reward is increased by a corresponding amount.

FIG. 6 is a data structure diagram showing an example of the gift DB 320 of FIG. 3. The gift DB 320 holds information regarding gifts available for the viewers in relation to the live-streaming. A gift is electronic data with the following characteristics:

It can be purchased in exchange for the points or money, or can be given for free.

It can be given to a streamer by a viewer within a live-stream and by an active user outside a live-stream. Giving a gift to a streamer is also referred to as using the gift or throwing the gift.

Some gifts may be purchased and used at the same time, and some gifts may be used by the viewer at any time after purchased.

When a gift is given to a streamer, a corresponding reward is awarded to the streamer.

When a gift is used, the use may trigger an effect associated with the gift. For example, an effect corresponding to the gift will appear on the live-streaming room screen.

The gift DB 320 stores: a gift ID for identifying a gift; a reward to be awarded to a streamer when the gift is given to the streamer; price points that is the price to be paid for the use of the gift; and a type of the gift, in association with each other. A viewer is able to give a desired gift to a streamer by paying the price points of the desired gift while viewing a live-stream of the streamer or outside a live-stream of the streamer. The payment of the price points may be made by appropriate electronic payment means. For example, the payment may be made by the viewer paying the price points to the administrator. Alternatively, bank transfers or credit card payments may be available. The administrator is able to desirably set the relationship between the reward to be awarded and the price points. For example, it may be set as the reward to be awarded=the price points. Alternatively, points obtained by multiplying the reward to be awarded by a predetermined coefficient such as 1.2 may be set as the price points, or points obtained by adding predetermined fee points to the reward to be awarded may be set as the price points.

Gifts are classified into types “in-stream,” “out-of-stream,” and “both.” The type “in-stream” indicates an in-stream gift, “out-of-stream” an out-of-stream gift, and “both” that the gift can be used either within or outside a live-stream. In-stream gifts are configured unavailable outside a live-stream, and out-of-stream gifts are configured unavailable within a live-stream.

The user terminal of a viewer participating in a live-stream requests a list of available gifts from the server 10 via the network 10. Upon receipt of the request, the in-stream gift processing unit 306 of the server 10 refers to the gift DB 320 and identifies gift IDs of the gifts classified into the “in-stream” and “both” types. The in-stream gift processing unit 306 generates a list of the identified gift IDs and transmits the list to the user terminal of the requester. The viewer-side UI control unit 202 in the user terminal of the requester shows on the display the gift icons of the gifts identified by the gift IDs in the received list.

The user terminal of an active user requests a list of available gifts from the server 10 via the network 10. Upon receipt of the request, the out-of-stream gift processing unit 308 of the server 10 refers to the gift DB 320 and identifies gift IDs of the gifts classified into the “out-of-stream” and “both” types. The out-of-stream gift processing unit 308 generates a list of the identified gift IDs and transmits the list to the user terminal of the requester. The out-of-stream UI control unit 402 in the user terminal of the requester shows on the display the gift icons of the gifts identified by the gift IDs in the received list.

FIG. 7 is a data structure diagram showing an example of the out-of-stream gift history DB 330 of FIG. 3. The out-of-stream gift history DB 330 holds information regarding out-of-stream gifts that have been used by users for streamers while the users are not participating in live-streams of the streamers. In particular, the out-of-stream gift history DB 330 holds histories of out-of-stream gifts used. The out-of-stream gift history DB 330 holds, for each out-of-stream gift used, the user ID of the recipient of the out-of-stream gift, the user ID of the giver of the out-of-stream gift, the time the out-of-stream gift was used, the gift ID of the out-of-stream gift, and the price points of the out-of-stream gift, in association with each other.

FIG. 8 is a data structure diagram showing an example of the out-of-stream gift ranking DB 332 of FIG. 3. The out-of-stream gift ranking DB 332 holds ranking information that indicates rankings of the users who have given out-of-stream gifts to a specific streamer by the quantity of out-of-stream gifts. An out-of-stream gift ranking DB 332 is generated for each streamer. The out-of-stream gift ranking DB 332 holds a rank, the user ID of a user who has given out-of-stream gifts to a specific streamer, and the total of the price points of the out-of-stream gifts given by the user to the specific streamer, in association with each other.

FIG. 9 is a data structure diagram showing an example of the out-of-stream gift total table 334 of FIG. 3. The out-of-stream gift total table 334 is generated upon a start of a live-stream by a streamer, in association with the live-stream. The out-of-stream gift total table 334 holds the result of totaling the out-of-stream gifts used for the streamer of the live-stream. The out-of-stream gift total table 334 holds the user ID of a user who has given one or more out-of-stream gifts to the streamer and the total of the price points of the out-of-stream gifts given by the user to the streamer, in association with each other.

The following now describes how the respective units work in two different phases: within a live-stream; and outside a live-stream.

(Outside Live-Stream)

Figure 10:
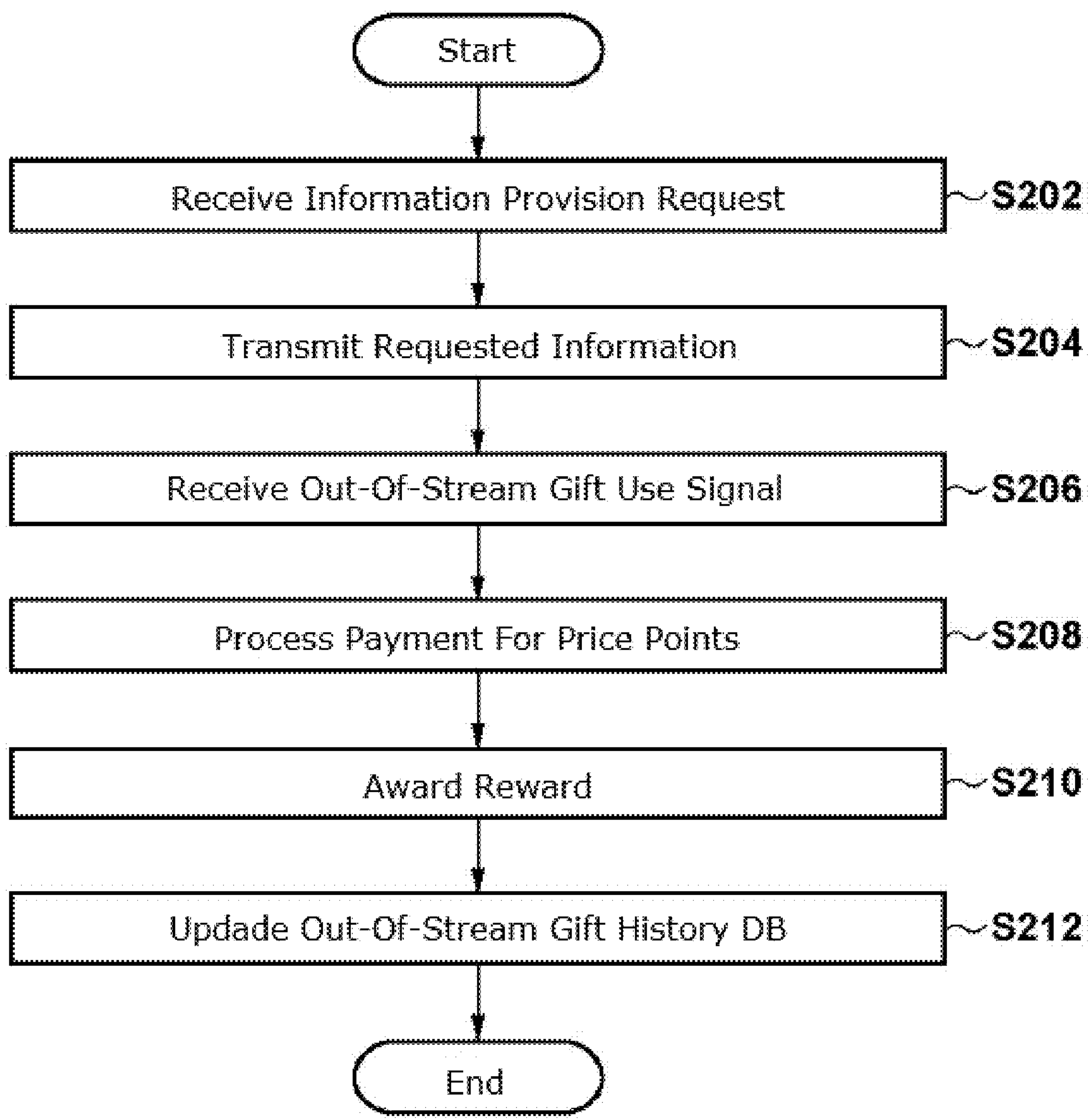
FIG. 10 is a flow chart showing a series of steps of a process performed in the live-streaming system when an active user gives an out-of-stream gift to a streamer.

FIG. 10 is a flow chart showing a series of steps of a process performed in the live-streaming system 1 when an active user gives an out-of-stream gift to a streamer. The active user inputs at a user terminal a view request for another user’s profile or for an archive of another user’s past live-streams, and the out-of-stream UI control unit 402 of the user terminal receives such a request. The out-of-stream communication unit 404 generates an information provision request corresponding to the received request, and transmits the information provision request to the server 10 over the network NW. The streaming information providing unit 302 receives the information provision request transmitted thereto (S202). The streaming information providing unit 302 retrieves the requested information and transmits the retrieved information to the user terminal of the requesting active user (S204). Based on the received information, the out-of-stream UI control unit 402 of the user terminal generates a screen corresponding to the request made by the active user and shows the generated screen on the display of the user terminal. For example, in the case of a view request for a profile, the information provision request includes the user ID of the user whose profile is to be retrieved. The information received by the out-of-stream communication unit 404 includes the profile of the user identified by the user ID included in the information provision request. Based on the received profile, the out-of-stream UI control unit 402 generates a profile screen and shows the generated screen on the display. In the case of a view request for an archived live-stream, the information provision request includes identifying information identifying the archived live-stream designated by the active user. The information received by the out-of-stream communication unit 404 includes the data of the archived live-stream identified by the identifying information included in the information provision request. The out-of-stream UI control unit 402 plays back the archived live-stream based on the received data.

The active user issues at the user terminal an instruction to use an out-of-stream gift on the profile screen or while the archived live-stream is played back. The out-of-stream UI control unit 402 receives the instruction. The out-of-stream communication unit 404 generates an out-of-stream gift use signal indicating that the active user is to use an out-of-stream gift to the streamer and transmits the generated out-of-stream gift use signal to the server 10 over the network NW. The out-of-stream gift processing unit 308 receives the out-of-stream gift use signal (S206). The out-of-stream gift use signal includes the user ID of the active user who has used the out-of-stream gift, the user ID of the streamer who receives the out-of-stream gift, and a gift ID identifying the out-of-stream gift.

In response to reception of the out-of-stream gift use signal, the payment processing unit 310 processes payment for the price points of the out-of-stream gift by the active user who has given the out-of-stream gift (S208). Specifically, the payment processing unit 310 refers to the gift DB 320 to identify the price points of the out-of-stream gift identified by the gift ID included in the out-of-stream gift use signal. The payment processing unit 310 then updates the user DB 318 to subtract the identified price points from the points associated with the user ID of the active user included in the out-of-stream gift use signal.

The out-of-stream gift processing unit 308 updates the user DB 318 to increase the reward of the streamer who receives the out-of-stream gift, depending on the reward to be awarded by the out-of-stream gift identified by the gift ID included in the out-of-stream gift use signal (S210). Specifically, the out-of-stream gift processing unit 308 refers to the gift DB 320 to identify the reward to be awarded corresponding to the gift ID included in the received out-of-stream gift use signal. The out-of-stream gift processing unit 308 then updates the user DB 318 to add the identified reward to the reward associated with the user ID of the streamer included in the out-of-stream gift use signal.

The out-of-stream gift processing unit 308 updates the out-of-stream gift history DB 330 in response to the reception of the out-of-stream gift use signal (S212). Specifically, the out-of-stream gift processing unit 308 registers, in the out-of-stream gift history DB 330, information on the out-of-stream gift used by the active user. The out-of-stream gift processing unit 308 adds a record to the out-of-stream gift history DB 330. The record includes, as the recipient user ID, the giver user ID, the time, the gift ID, and the price points, the user ID of the streamer included in the out-of-stream gift use signal, the user ID of the active user included in the out-of-stream gift use signal, the time when the server 10 receives the out-of-stream gift use signal, the gift ID included in the out-of-stream gift use signal, and the price points of the out-of-stream gift identified by the gift ID.

The out-of-stream gift processing unit 308 accesses the out-of-stream gift history DB 330 periodically, e.g., once a day, and deletes any out-of-stream gifts for which a predetermined period of time has elapsed since they are used. For example, the out-of-stream gift processing unit 308 deletes a record held in the out-of-stream gift history DB 330 if the difference between the performed time and the current time exceeds 30 days.

(Within Live-Stream)

Figure 11:
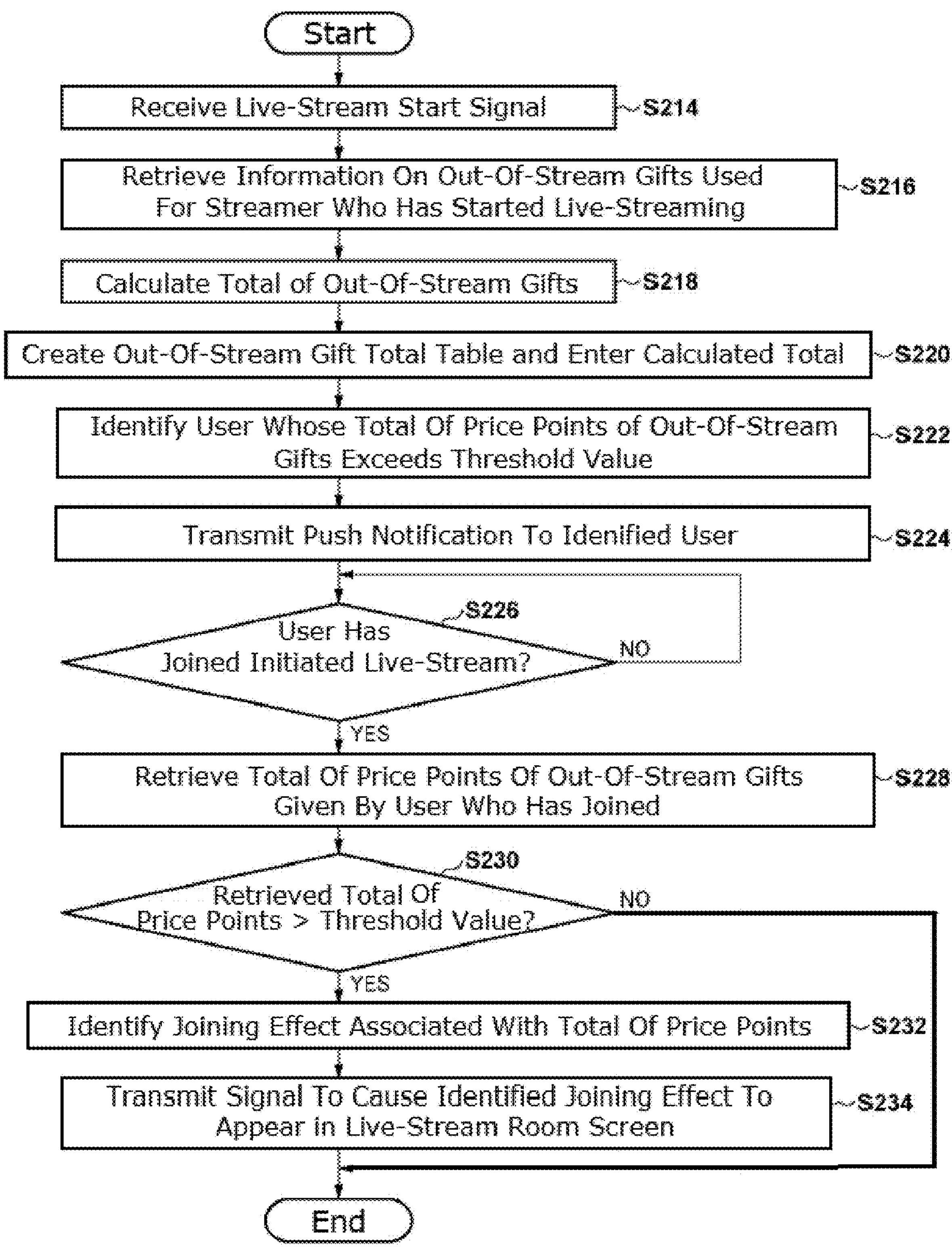
FIG. 11 is a flow chart showing a series of steps of a process performed in the live-streaming system when a streamer starts live-streaming and a user joins the live-stream.

FIG. 11 is a flow chart showing a series of steps of a process performed in the live-streaming system 1 when a streamer starts live-streaming and a user joins the live-stream. The streaming start receiving unit 322 receives, from the user terminal 20 of the streamer over the network NW, a live-stream start signal indicating that a live-stream starts (S214). The stream start receiving unit 322 registers in the stream DB 314 a stream ID identifying the live-stream that has started and the streamer ID of the streamer who performs the live-stream.

The out-of-stream gift totaling unit 324 obtains information regarding the out-of-stream gifts used for the streamer who has started live-streaming in the step S214 (S216). The out-of-stream gift totaling unit 324 refers to the out-of-stream gift history DB 330 to retrieve one or more records having as the recipient user ID the streamer ID of the streamer of the live-stream that has started in the step S214, and also deletes the retrieved records from the out-of-stream gift history DB 330.

The out-of-stream gift totaling unit 324 calculates the total of the out-of-stream gifts used for the streamer of the live-stream that has started in the step S214 (S218). The out-of-stream gift totaling unit 324 calculates, for each giver user ID, the total of the price points included in the records retrieved in the step S216. The out-of-stream gift totaling unit 324 creates a new out-of-stream gift total table 334, which is associated with the live-stream initiated in the step S214. The out-of-stream gift totaling unit 324 enters, in the out-of-stream gift total table 334, the result of the calculation, that is to say, the giver user IDs and the totals of the price points of the out-of-stream gifts given by the respective users identified by the giver user IDs (S220). According to the example in FIG. 7, when a streamer "S005" starts live-streaming, the out-of-stream gift totaling unit 324 calculates the total of the price points of the out-of-stream gifts for the giver user ID "SS5" (4500="4000+500), and registers the calculated total in the out-of-stream gift total table 334. Hereinafter, the term "out-of-stream gifter" refers to the giver user registered in the out-of-stream gift total table 334 generated in association with the live-stream.

The out-of-stream gifts totaled in the step S218 are the out-of-stream gifts that are given to the streamer from when the streamer ends the previous live-stream to when the streamer starts the current live stream. Here, it should be noted that the out-of-stream gift processing unit 308 periodically updates the out-of-stream gift history DB 330. For this reason, if the previous live-stream takes place more than 30 days ago, the out-of-stream gifts to be totaled in the step S218 are those that are given to the streamer within the last 30 days and before the current live stream starts. Since relatively old out-of-stream gifts are excluded from the total, the user and streamer can be saved from getting confused by a joining effect that appears corresponding to an out-of-stream gift the user does not remember.

The streaming information providing unit 302 identifies an out-of-stream gifter satisfying a push notification transmission requirement, that is to say, a big out-of-stream gifter. The big out-of-stream gifter is selected from among the out-of-stream gifters since the big out-of-stream gifter has a total of price points of the out-of-stream gifts exceeding a threshold value (S222). The threshold value may be set by the administrator to, for example, 100, 1,000, 3,000 and the like. The streaming information providing unit 302 refers to the out-of-stream gift total table 334 generated and updated in the step S220 to identify, as the big out-of-stream gifter, a giver user having a total of price points greater than the threshold value.

The streaming information providing unit 302 generates a push notification including the information regarding the live-stream initiated in the step S214 and transmits the generated push notification to the user terminal of the big out-of-stream gifter identified in the step S222 via the network NW (S224). In the example shown in FIG. 9, the streaming information providing unit 302 identifies, as the big out-of-stream gifter, giver users "SS43" and "SS5" having a total of price points greater than the threshold value=3000. The streaming information providing unit 302 generates a push notification including a text stating that the streamer "S005" has started a live-stream and a link allowing the giver users to join the live-stream, and transmits the generated push notification to the user terminals of the big out-of-stream gifters "SS43" and "SS5." In this way, the streamer can selectively transmit a push notification to the big out-of-stream gifters who have given relatively many out-of-stream gifts to the streamer and are thus highly committed to the streamer, while the streamer can use only a limited number of push notifications. Accordingly, the streamer can attract the largest number of viewers with the least number of push notifications. In addition, since the big out-of-stream gifters who have given a relatively large number of out-of-stream gifts are more likely to join live-streams of the streamer, the streamer is less likely to miss thanking the big out-of-stream gifters. From the perspective of the big out-of-stream gifters, they have a better chance of experiencing a special joining effect, which will be described below, because they receive the push notification.

The streaming information providing unit 302 receives a request made by any of the active users including the out-of-stream gifters to participate in the live-stream initiated in the step S214, from the user terminal of the active user over the network NW (S226). The participation request is received along the following two possible routes in the present embodiment.

(1) Route Originating at the Push Notification Transmitted in the Step S224

In the case of this route, the user terminal that has received the push notification generates a request to participate in the live-stream initiated in the step S214 in response to the push notification, and transmits the generated request to the server 10.

(2) Route Originating at the Live-Stream Selection Screen

According to this route, the streaming information providing unit 302 receives, over the network NW, an information provision request regarding live-streams from the out-of-stream communication unit 404 of the user terminal of the active user. When receiving the information provision request, the streaming information providing unit 302 refers to the stream DB 314 and generates a list of currently available live-streams. This list includes the live-stream initiated in the step S214. The streaming information providing unit 302 transmits the generated list to the requesting user terminal over the network NW. The out-of-stream UI control unit 402 of the requesting user terminal generates a live-stream selection screen based on the received list and shows the live-stream selection screen on the display of the user terminal. If the live-stream initiated in the step S214 is selected on the live-stream selection screen, the out-of-stream communication unit 404 generates a request to participate in the selected live-stream, and transmits the request to the server 10 over the network NW.

On reception of the request for participation, the streaming information providing unit 302 starts providing, to the requesting user terminal, the live-stream initiated in the step S214. The streaming information providing unit 302 updates the stream DB 314 to include the user ID of the active user of the requesting user terminal into the viewer IDs of the stream ID of the live-stream. In this way, the active user can successfully join the live-stream.

When the request for participation is accepted, the effect determining unit 326 refers to the out-of-stream gift total table 334 to determine whether to display a joining effect to reflect use of an out-of-stream gift by the active user who has issued the participation request. The effect determining unit 326 first refers to the out-of-stream gift total table 334 to determine whether the active user who has requested participation is an out-of-stream gifter. The effect determining unit 326 determines that no joining effect is to appear if the active user is not an out-of-stream gifter. In a case where the active user is an out-of-stream gifter, the effect determining unit 326 determines to display a joining effect if the total amount of the out-of-stream gifts given by the out-of-stream gifter satisfies a certain criterion. Otherwise, the effect determining unit 326 determines not to display a joining effect. When the out-of-stream gifter participates in the live stream initiated in the step S214 (YES in S226), the effect determining unit 326 refers to the out-of-stream gift total table 334 to retrieve the total of price points of the out-of-stream gifts given by the out-of-stream gifter who has participated (S228). The effect determining unit 326 compares the retrieved total of price points against a threshold value (S230). The threshold values referred to in the steps S230 and S222 may be set to the same or different values. In the present embodiment, the threshold values are set to the same value. The effect determining unit 326 determines not to display a joining effect if the retrieved total of price points is equal to or less than the threshold value (NO in S230).

If the retrieved total of price points exceeds the threshold value (YES in S230), the effect determining unit 326 determines that the out-of-stream gifter is a big out-of-stream gifter and identifies a joining effect associated with the total of price points (S232). In the present embodiment, a plurality of different joining effects are provided corresponding to a plurality of different ranges of the total of price points. In one example, the higher the total of price points is, the more impressive the joining effect is. The data used to display the joining effects may be held in the server 10 and transmitted to the user terminal as needed. Alternatively, the user terminal may retain the data used to display the joining effects. In this case, the effect determining unit 326 may generate a signal identifying which joining effect is to be displayed and transmit the generated signal to the user terminal. In the present embodiment, it is the user terminal which holds a plurality of pieces of data to display a plurality of joining effects of different levels of impressiveness. The effect determining unit 326 retrieves a joining effect ID of the joining effect associated with the total of price points.

The effect determining unit 326 generates a joining effect identifying signal to allow the joining effect identified in the step S232 to appear on the live-stream room screen and transmits the joining effect identifying signal to the user terminals of all users (streamer and viewers) participating in the live-stream initiated in the step S214 (S234). The joining effect identifying signal includes the joining effect ID retrieved in the step S232.

For example, the total of price points is related to the joining effect as follows.

| Total of Price Points | Joining Effect | Joining Effect ID |
|---|---|---|
| 0 to 2999 | None | |
| 3000-3999 | Small Effect of Short Duration | G1 |
| 4000- | Long Effect of Long Duration | G2 |

Upon a start of a live-stream by a streamer "S005," the out-of-stream gift total table 334 shown in FIG. 9 is created. When the big out-of-stream gifter "SS43" joins the live stream, the effect determining unit 326 refers to the out-of-stream gift total table 334 to retrieve the total of price points "3500." The effect determining unit 326 consults the above-described relation, to retrieve a joining effect ID "G1." The effect determining unit 326 generates a joining effect identifying signal including the retrieved joining effect ID "G1" and transmits the joining effect identifying signal to the user terminal of the big out-of-stream gifter "SS43." The viewer-side UI control unit 202 of the user terminal causes a small effect of a short duration corresponding to the joining effect ID "G1" included in the received joining effect identifying signal to appear on the live-streaming room screen. The joining effect identifying signal is also transmitted to the user terminal of the streamer and to the user terminals of the other viewers, each of which displays the same small effect of a short duration. In this manner, the big out-of-stream gifter "SS43" can view the joining effect almost at the same time as the gifter "SS43" joins the live-stream. Accordingly, the big out-of-stream gifter "SS43" can feel special and recognized by the streamer unlike users who have not given out-of-stream gifts to the streamer. In addition, viewing the joining effect, the streamer can be aware that the big out-of-stream gifter, who has given a predetermined quantity of out-of-stream gifts or more to him/her, has participated in the live-stream. The streamer can thus directly express his/her gratitude to the big out-of-stream gifter within the live-stream.

Returning to FIG. 3, the following now describes the other functional units. The relay unit 304 relays the video data from the streamer-side user terminal 20 to the viewer-side user terminal 30 in the live-stream started by the streaming information providing unit 302. The relay unit 304 receives from the viewer-side communication unit 204 a signal that represents user input by a viewer during the live-stream or reproduction of the video data. The signal that represents user input may be an object specifying signal for specifying an object displayed on the display of the user terminal 30, and the object specifying signal includes the viewer ID of the viewer, the streamer ID of the streamer of the live-stream that the viewer watches, and an object ID that identifies the object. When the object is a gift icon, the object ID is the gift ID. The object specifying signal in that case is an in-stream gift use signal indicating that a viewer uses an in-stream gift for a streamer. Similarly, the relay unit 304 receives from the streamer-side communication unit 110 of the streaming unit 100 in the user terminal 20 a signal that represents user input by the streamer during reproduction of the video data, such as an object specifying signal.

The in-stream gift processing unit 306 updates the user DB 318 to increase the reward of the streamer by an amount determined by the reward to be awarded by the in-stream gift identified by the gift ID included in the in-stream gift use signal. The payment processing unit 310 processes payment of the price of the in-stream gift by the viewer in response to reception of the in-stream gift use signal.

The ranking unit 328 periodically refers to the out-of-stream gift history DB 330 to generate ranking information for each registered recipient user. The ranking unit 328 updates the out-of-stream gift ranking DB 332 based on the generated ranking information.

Figure 12:
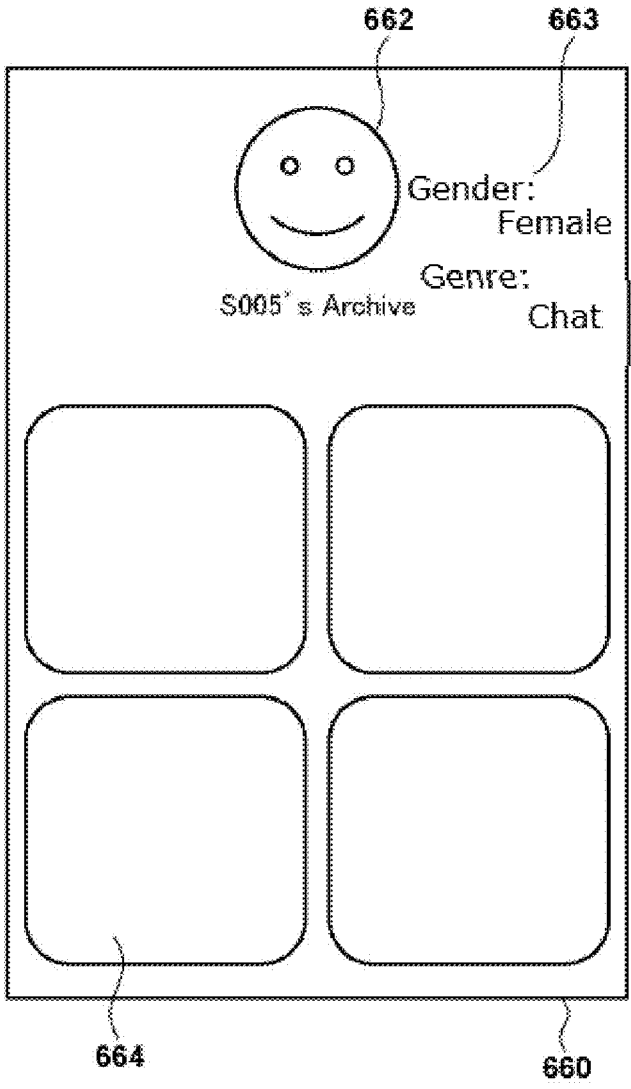
FIG. 12 is a representative screen image of a profile screen displayed on the display of the active user's user terminal.

FIG. 12 is a representative screen image of a profile screen 660 displayed on the display of the active user's user terminal. The active user operates the user terminal to identify a streamer of interest, and the user terminal communicates with the server 10 to show a profile screen 660 of the identified streamer on the display. The profile screen 660 has an icon 662 indicative of the streamer, profile information 663 such as an attribute of the streamer, and thumbnails 664 representing edited video data generated by recording the past live-streams of the streamer, or an archive of the past live-streams.

The streamer generates an archive by recording and editing his or her past live-streams. Once the streamer uploads the generated archive to the server 10, the thumbnails 664 representing the uploaded archive are displayed on the streamer's profile screen 660. Alternatively, the archive may be edited and generated at the server 10. The technology of generating archives of live-streams is well known and thus not described in detail herein.

Figure 13:
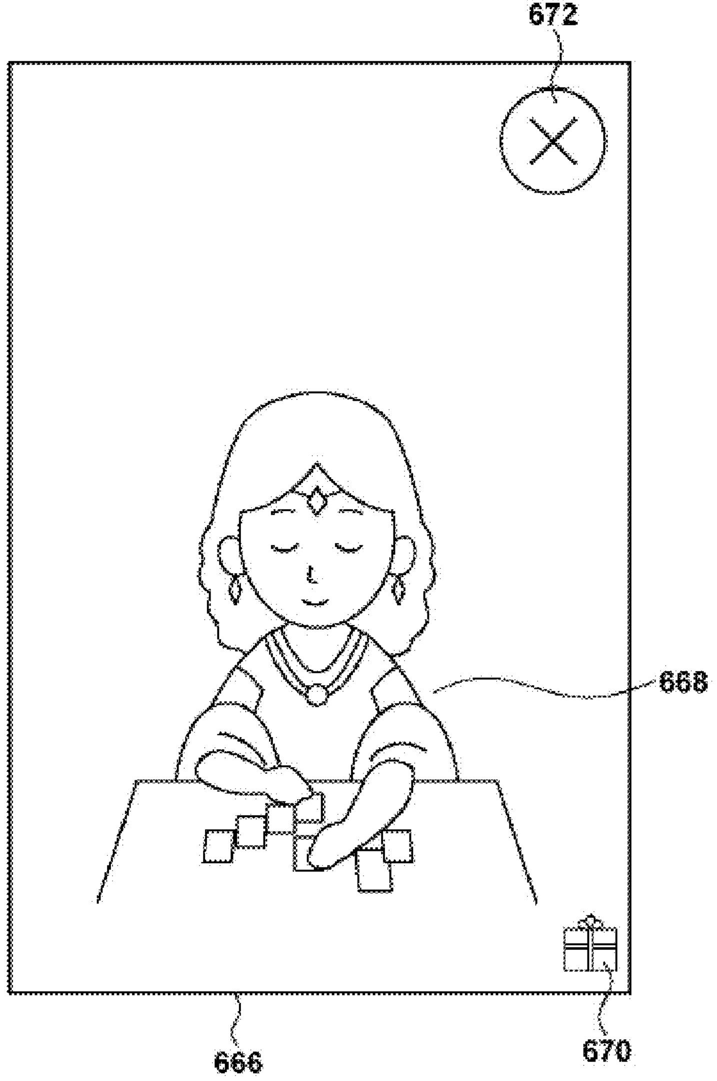
FIG. 13 is a representative screen image of an archive replay screen displayed on the display of the active user's user terminal.

FIG. 13 is a representative screen image of an archive playback screen 666 appearing on the display of the active user's user terminal. When one of the thumbnails 664 is tapped on the profile screen 660 shown in FIG. 12, the out-of-stream UI control unit 402 and the out-of-stream communication unit 404 receive from the server 10 the archived data corresponding to the tapped thumbnail 664 and plays back the received data on the archive playback screen 666 in the manner described above with reference to FIG. 10. The archive playback screen 666 has the streamer's past video image 668 obtained by playing back the archived data represented by the tapped thumbnail 664, an out-of-stream gift object 670, and a viewing end button 672.

Figure 14:
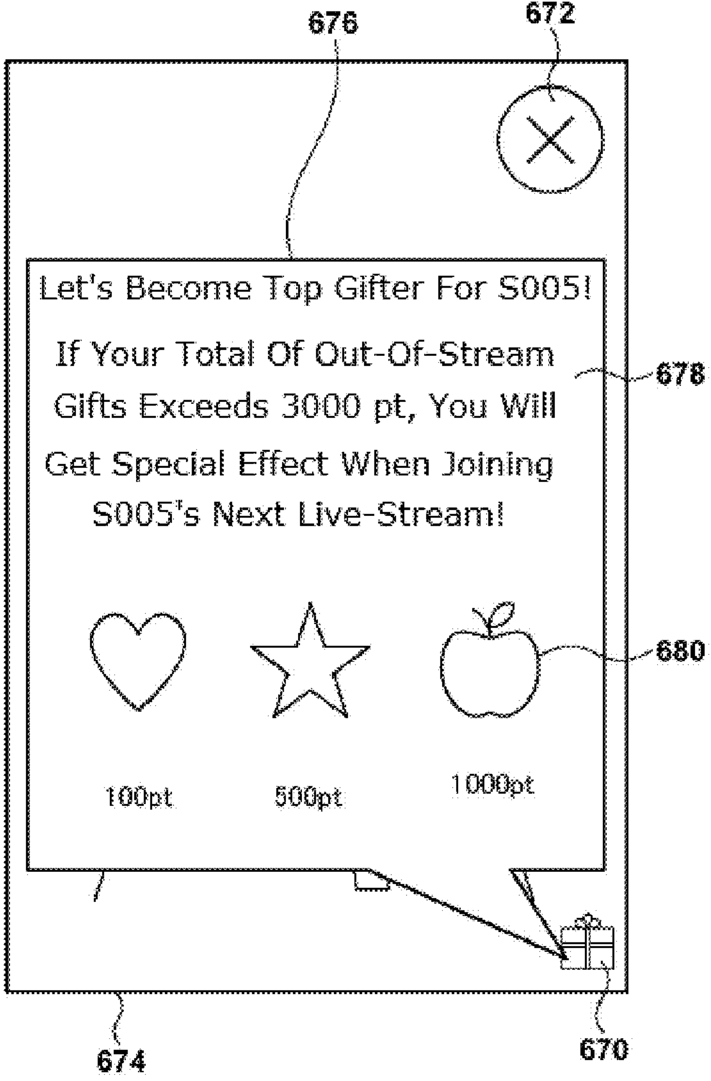
FIG. 14 is a representative screen image of an out-of-stream gifting screen displayed on the display of the active user's user terminal.

FIG. 14 is a representative screen image of an out-of-stream gifting screen 674 appearing on the display of the active user's user terminal. When the out-of-stream gift object 670 is tapped on the archive playback screen 666 shown in FIG. 13, the list of available out-of-stream gifts is transmitted from the server 10 to the user terminal as described above with reference to FIG. 6. Based on the received list, the out-of-stream UI control unit 402 generates the out-of-stream gifting screen 674 including an out-of-stream gift pop-up 676 including gift icons of out-of-stream gifts and shows it on the display of the user terminal.

The out-of-stream gift pop-up 676 is an object for receiving an instruction made by the active user to use an out-of-stream gift to the streamer, who owns the archived data being played back. The out-of-stream gift pop-up 676 has text 678 explaining the relation between out-of-stream gifts and joining effects for participation in the next live-stream, and gift icons 680 representing out-of-stream gifts. The out-of-stream gifts represented by the gift icons 680 displayed in the out-of-stream gift pop-up 676 are among the gifts included in the list received by the user terminal from the server 10.

By selecting and tapping any of the gift icons 680 representing the desired out-of-stream gift, the active user can give the out-of-stream gift to the owner of the archived data, i.e., the streamer. The out-of-stream UI control unit 402 identifies the tapped gift icon 680. The out-of-stream communication unit 404 generates an out-of-stream gift use signal and transmits the generated signal to the server 10 over the network NW. The out-of-stream gift use signal includes the user ID of the active user who has used the out-of-stream gift, the user ID of the streamer who owns the archived data being played back when the gift icon 680 is tapped, and the gift ID identifying the out-of-stream gift represented by the tapped gift icon 680. After this, the out-of-stream gift is handled in the above-described manner. As described above, the out-of-stream UI control unit 402 receives the instruction to use the out-of-stream gift while the active user is viewing the archived live-stream of the streamer.

Figure 15:
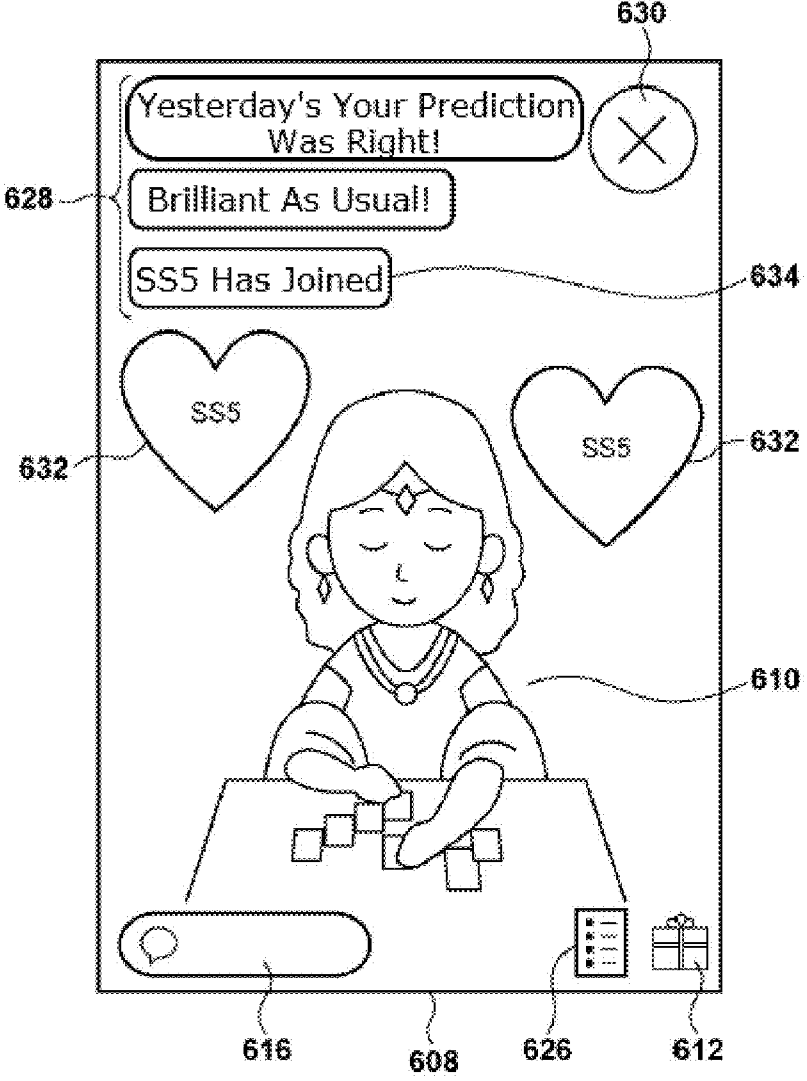
FIG. 15 is a representative screen image of a live streaming room screen on the display of a user terminal of a big out-of-stream gifter when the big out-of-stream gifter joins a live-stream of a streamer.

FIG. 15 is a representative screen image of a live-streaming room screen 608 appearing on the display of the user terminal of the big out-of-stream gifter when the big out-of-stream gifter joins the live-stream of the streamer. The active user may give out-of-stream gifts to the streamer via the out-of-stream gifting screen 674 shown in FIG. 14 and the total amount of the out-of-stream gifts may exceed the threshold value. Under such circumstances, the active user (i.e., the big out-of-stream gifter) may join or participate in the streamer's live-stream. In this case, the live streaming room screen 608 including a joining effect 632 appears on the display. Having participated in the live-stream, the big out-of-stream gifter is now a viewer of the live-stream. For the big out-of-stream gifter who satisfies the criterion regarding the total amount of the out-of-stream gifts, the viewer-side UI control unit 202 causes the joining effect to be displayed in response to the participation by the big out-of-stream gifter in the streamer's live-stream.

The live-streaming room screen 608 includes a video image 610 of the streamer obtained by reproducing the video data received from the server 10, a gift object 612, a comment input region 616, a ranking object 626, a comment display region 628, a viewing end button 630, and a joining effect 632. The live-streaming room screen 608 can be generated by superimposing, on the video image 610 obtained by reproducing the video data by the viewer-side UI control unit 202, other objects such as the gift object 612, the comment input region 616, the ranking object 626, the comment display region 628, the viewing end button 630 and the joining effect 632.

The comment display region 628 may include comments entered by the big out-of-stream gifter, comments entered by other viewers, and notifications from the system. The notifications from the system include information on who has given which gift to the streamer, and information on viewers who have joined the live-stream. The viewer-side communication unit 204 receives, from the server 10, the comments entered by the other viewers and the notifications issued by the system. The viewer-side UI control unit 202 generates the comment display region 628 including the received comments and notifications, and includes the generated comment display region 628 in the live-streaming room screen 608.

The comment input region 616 allows the big out-of-stream gifter to enter a comment. The viewer-side communication unit 204 generates a comment input signal that includes the comment entered in the comment input region 616, and transmits the signal to the server 10 over the network NW. At the same time, the user terminal updates the comment display region 628 to display the comment entered in the comment input region 616.

The joining effect 632 is an effect identified by the joining effect ID included in the joining effect identifying signal received from the server 10 in response to the request for participation in the lives-stream transmitted by the user terminal. A still image or animation is rendered to display the joining effect 632. While the streamer is live-streaming, the viewing unit 200 causes the display to show the joining effect corresponding to the use of the out-of-stream gift by the big out-of-stream gifter. If the total amount of out-of-stream gifts given to the streamer by the out-of-stream gifter before the streamer starts live-streaming exceeds the threshold value, the joining effect identifying signal is transmitted from the server 10, and the viewer-side communication unit 204 receives the joining effect identifying signal. The viewer-side UI control unit 202 retrieves the data of the joining effect 632 identified by the joining effect ID included in the received joining effect identifying signal, and superimposes the joining effect 632 on the live-streaming room screen 608 so that the joining effect 632 can appear on the live-streaming room screen 608 at substantially the same time as the big out-of-stream gifter joins or participates in the live-stream. Since the information 634 on the big out-of-stream gifter is displayed in the comment display region 628 upon participation of the big out-of-stream gifter, the information 634 appears at substantially the same time as the joining effect 632 appears. The joining effect 632 may include the user ID of the big out-of-stream gifter or the giver, or other information identifying the user of interest.

As described above, if the active user gives an out-of-stream gift, the server 10 registers the giver, the recipient, the gift ID and the time in the out-of-stream gift history DB 330 in association with each other. At the start of the streamer's live-stream, the server 10 retrieves from the DB 330 the information on the out-of-stream gifts given to the streamer. The retrieved information includes the information on the out-of-stream gifters. Based on the retrieved information, the server 10 can thus detect whether any of the out-of-stream gifters has joined the live-stream. Upon detection of the participation, the server 10 first compares the total amount of out-of-stream gifts given by the out-of-stream gifter who has participated with the threshold value. If the former exceeds the latter, the server 10 transmits the joining effect identifying signal instructing to display a joining effect, to the user terminals participating in the live-stream. In this way, the same joining effect as the joining effect 632 appears on the live-streaming room screen on the user terminal of the streamer who is live-streaming and on the user terminals of all of the viewers participating in the live-stream. In particular, the streamer-side communication unit 110 of the user terminal of the streamer who is live-streaming receives the joining effect identifying signal. While the streamer is live-streaming, the streamer-side UI control unit 108 causes the display to show the joining effect 632 corresponding to the use of the out-of-stream gifts given to the streamer. If the total amount of out-of-stream gifts given by the out-of-stream gifter who has participated in the live-stream is equal to or less than the threshold value, the server 10 does not transmit the joining effect identifying signal. In other words, the viewing unit 200 of the user terminal of the out-of-stream gifter causes the display to show no joining effect if the total amount of out-of-stream gifts used by the out-of-stream gifter for the streamer is equal to or less than the threshold value.

Figure 16:
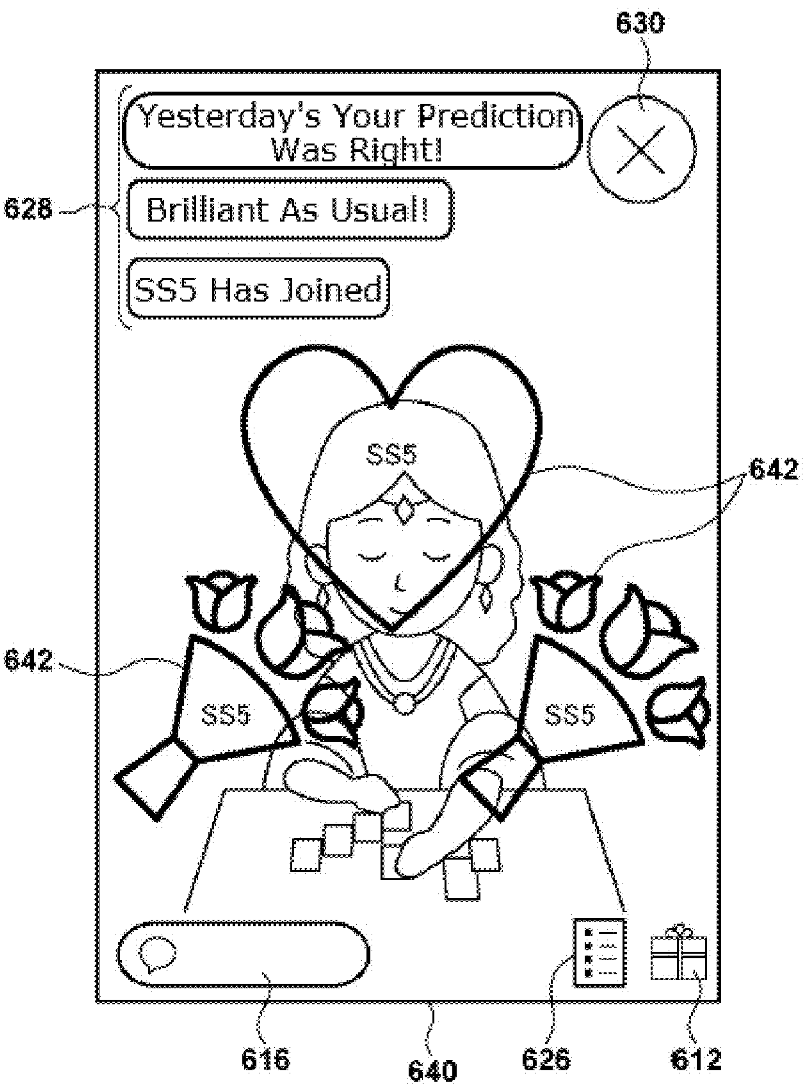
FIG. 16 is a representative screen image of a live streaming room screen on the display of a user terminal of a big out-of-stream gifter when the big out-of-stream gifter joins a live-stream of a streamer.

FIG. 16 is a representative screen image of a live-streaming room screen 640 shown on the display of the user terminal of the big out-of-stream gifter when the big out-of-stream gifter participates in the live-stream of the streamer. For the big out-of-stream gifter who satisfies the criterion of the total amount of out-of-stream gifts, the viewer-side UI control unit 202 causes a joining effect 642 to appear in response to the participation by the big out-of-stream gifter in the streamer's live-stream. The live-streaming room screen 640 is configured in the same manner as the live-streaming room screen 608 of FIG. 15, except for the joining effect 642. The joining effect depends on the quantity of out-of-stream gifts used by the big out-of-stream gifter to the streamer. The joining effect 632 shown in the example in FIG. 15, which is a small effect of short duration, corresponds to the above-mentioned joining effect ID "G1." The joining effect 642 shown in the example in FIG. 16, which is a large effect of long duration, corresponds to the above-mentioned joining effect ID "G2." Specifically, the joining effect corresponding to the joining effect ID "G2" is fancier, more impressive, or showier than the joining effect corresponding to the joining effect ID "G1."

Figure 17:
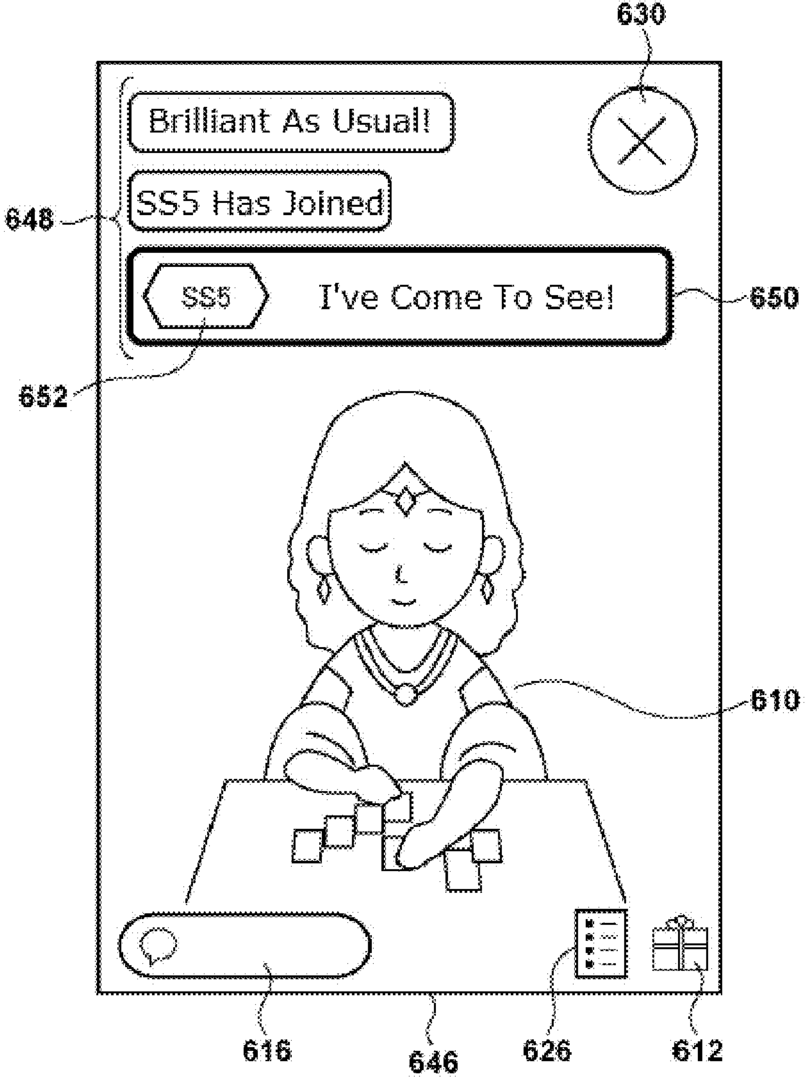
FIG. 17 is a representative screen image of a live streaming room screen on the display of a user terminal of a big out-of-stream gifter when the big out-of-stream gifter enters a comment.

FIG. 17 is a representative screen image of a live-streaming room screen 646 shown on the display of the user terminal of the big out-of-stream gifter when the big out-of-stream gifter enters a comment. The live-streaming room screen 646 includes the video image 610 of the streamer, a gift object 612, a ranking object 626, a comment input region 616, a comment display region 648, and a viewing end button 630. The big out-of-stream gifter, who has joined with the joining effect 632 or 642 shown in FIG. 15 or 16, enters a text saying "I've come to see!" in the comment input region 616 after the joining effect 632 or 642 ends. In FIG. 17, the text thus entered appears in the comment display region 648 as a comment 650. In the comment display region 648, the comment 650 is associated with a badge 652 and a frame, which depends on the quantity of out-of-stream gifts used for the streamer by the big out-of-stream gifter who has entered the comment 650. The badge 652 indicates the user ID of the big out-of-stream gifter who has entered the comment. The badge 652 of the big out-of-stream gifter is differently displayed than the badges of the other viewers. Specifically, the badge 652 of the big out-of-stream gifter is displayed in a more prominent manner than the badges of the other viewers. For example, the former has a larger size, and/or a different color, and/or a different font than the latter. The frame of the comment 650 of the big out-of-stream gifter is differently displayed than the frames of the comments of the other viewers. Specifically, the frame of the comment 650 of the big out-of-stream gifter is displayed in a more prominent manner, for example, is drawn by thicker lines or has a larger size than the frames of the comments of the other viewers. At the streamer's user terminal and the other users' user terminals, the comment 650 of the big out-of-stream gifter is displayed in the same manner as in FIG. 17.

Figure 18:
FIG. 18 is a representative screen image of an out-of-stream gift ranking screen appearing on the display of a user terminal of a viewer.

FIG. 18 is a representative screen image of an out-of-stream gift ranking screen 654 appearing on the display of the viewer's user terminal. If the viewer taps the ranking object 626 on the screens shown in FIGS. 15, 16, and 17, the viewer-side UI control unit 202 interprets the tap as a ranking display request. On reception of the ranking display request, the viewer-side communication unit 204 generates a ranking information request including the streamer ID indicative of the streamer and transmits the request to the server 10 over the network NW. The ranking unit 328 of the server 10 identifies the out-of-stream gift ranking DB 332 associated with the streamer ID included in the ranking information request and retrieves ranking information from the identified out-of-stream gift ranking DB 332. The ranking unit 328 transmits the retrieved ranking information to the requesting user terminal. The viewer-side communication unit 204 receives the transmitted ranking information. Based on the received ranking information, the viewer-side UI control unit 202 generates the out-of-stream gift ranking screen 654 and shows the generated screen on the display. The out-of-stream gift ranking screen 654 has rankings determined by the total amount of out-of-stream gifts effective in the live-stream the viewer is currently viewing, and rankings determined by the total amount of the out-of-stream gifts used for the streamer of the live-stream. The former is basically obtained by ranking the out-of-stream gift total table 334 associated with the live-stream based on the total of price points. The latter is obtained by ranking the users based on the total of the out-of-stream gifts given to the streamer of the live-stream, without being limited to the currently viewed live-stream.

FIG. 18 shows an example where the out-of-stream gift ranking screen 654 is shown during the live-stream. Outside the live-stream, however, the out-of-stream processing unit 400 may also generate the out-of-stream gift ranking screen 654 in the same manner as described above and cause the display to show the generated screen 654, in response to a request from the active user. In this case, the out-of-stream gift ranking screen 654 allows the active user to know whether s/he can get a joining effect when s/he joins the next live-stream. In addition, the active user is motivated to give many out-of-stream gifts to achieve a high ranking if s/he can enjoy fancy joining affects by achieving a high ranking. This can encourage the active user to use out-of-stream gifts.

In the above embodiment, the live-streaming system 1 may comprise a holding unit for storing various information used for the service provided by the live-streaming system 1. The holding unit includes a hard disk or semiconductor memory. It is understood by those skilled in the art that each element or component can be realized by a CPU not shown, a module of an installed application program, a module of a system program, or a semiconductor memory that temporarily stores the contents of data read from a hard disk, and the like.

According to the live streaming system 1 relating to the embodiment, if an active user gives a gift to a streamer outside a live-stream of the streamer, a corresponding joining effect is generated as feedback when the giver or the active user who has given the out-of-stream gift joins the next live-stream of the recipient or the streamer. This can enhance the sense of feedback experienced by the viewer in return for the out-of-stream gift given by the viewer outside a live-stream. The joining effect allows the streamer to know that the viewer who has joined the live-stream is someone who has supported him or her outside a live-stream. In this way, the streamer can directly show his or her gratitude. In addition, the viewer can also feel honored and rewarded. As a result, the viewers can be motivated to give gifts outside a live-stream, and the connection between the streamers and the viewers can be strengthened.

In addition, in the live streaming system 1 relating to the embodiment, when a viewer participates in a live-stream of a certain streamer, no joining effects are output unless the quantity of out-of-stream gifts that have been used by the viewer for the streamer reaches the threshold value. In this manner, joining effects can keep providing the sense of being special as they avoid appearing too frequently.

In the live streaming system 1 relating to the embodiment, when the viewer participates in the live-stream, a joining effect is also displayed on the live-streaming room screen of the streamer if the quantity of out-of-stream gifts that have been used by the viewer for the streamer reaches the threshold value. In this way, the streamer is less likely to forget expressing his or her gratitude to the viewer who has given the streamer many out-of-stream gifts. In addition, out-of-stream gifts for a certain streamer are totaled before every live-stream starts. Therefore, the streamer is less likely to express his or her gratitude redundantly, in other words, to forget that the streamer has already expressed his or her gratitude.

In the live streaming system 1 relating to the embodiment, the larger quantity of out-of-stream gifts a viewer gives to a streamer, the more impressive joining effects the viewer can get. The viewer may thus give many out-of-stream gifts to emphasize his/her engagement to the streamer.

In the live streaming system 1 relating to the embodiment, the comments posted by viewers who have given more out-of-stream gifts than the threshold value are displayed in a more prominent manner than those posted by viewers who have not. The viewers who have given out-of-stream gifts can thus feel special as their comments are distinguished from the comments made by the viewers who have not given many out-of-stream gifts. In addition, while joining effects are shown only when the corresponding viewers join, the special badges and frames of their comments are displayed every time the viewers make comments. Due to the distinctively shown comments, the viewers can thus enjoy feeling special repeatedly and continuously.

Figure 19:
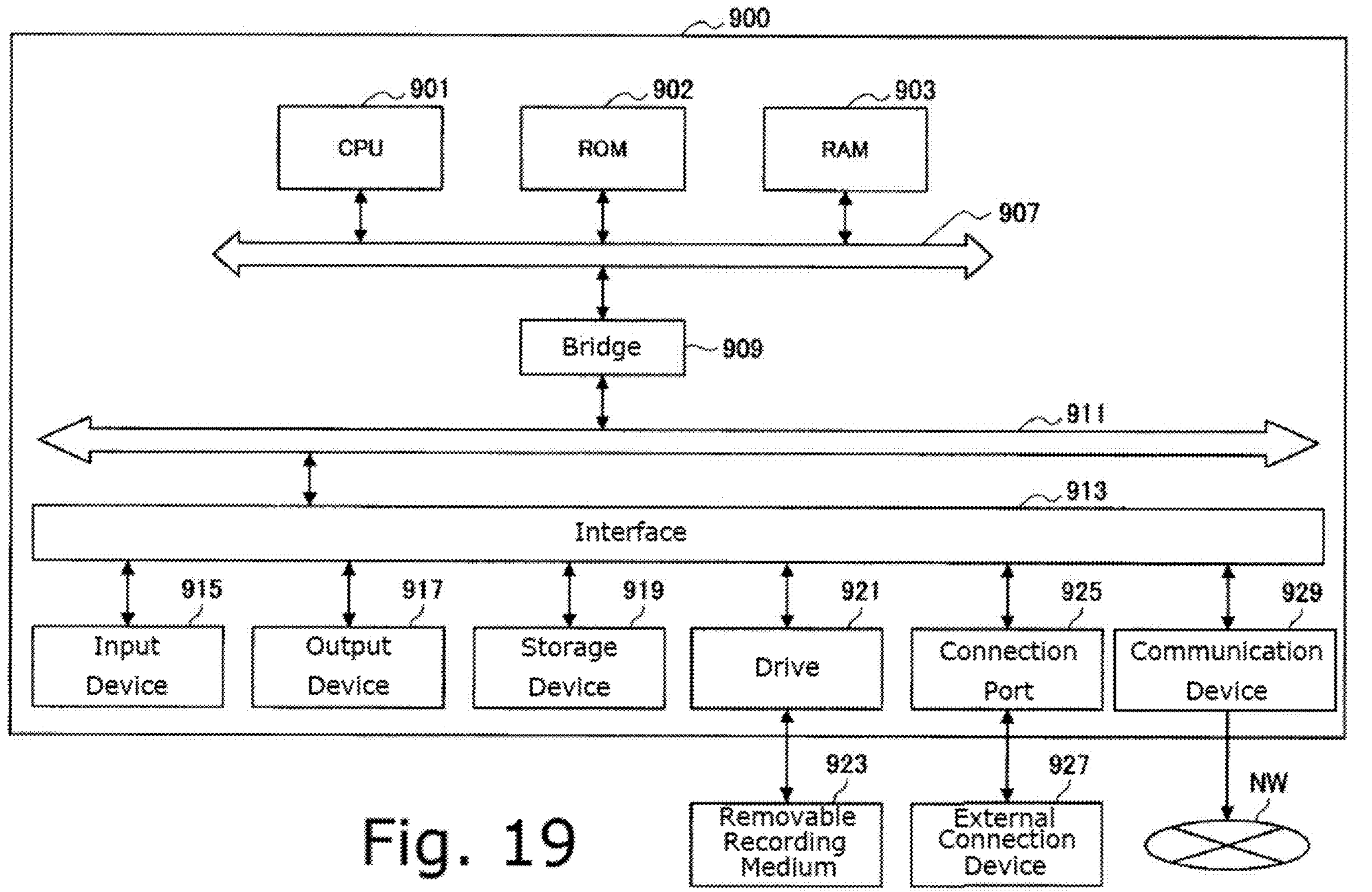
FIG. 19 is a block diagram showing an example of the hardware configuration of an information processing device according to an embodiment.

Referring to FIG. 19, the hardware configuration of an information processing device relating to an embodiment of the disclosure will be now described. FIG. 19 is a block diagram showing an example of the hardware configuration of the information processing device according to the embodiment. The illustrated information processing device 900 may, for example, realize the server 10 and the user terminals 20 and 30 in the embodiment.

The information processing device 900 includes a CPU 901, ROM (Read Only Memory) 902, and RAM (Random Access Memory) 903. The information processing device 900 may also include a host bus 907, a bridge 909, an external bus 911, an interface 913, an input device 915, an output device 917, a storage device 919, a drive 921, a connection port 925, and a communication device 929. In addition, the information processing device 900 includes an image capturing device such as a camera (not shown). In addition to or instead of the CPU 901, the information processing device 900 may also include a processing circuit such as a DSP (Digital Signal Processor) or ASIC (Application Specific Integrated Circuit).

The CPU 901 functions as an arithmetic processing device and a control device, and controls all or some of the operations in the information processing device 900 according to various programs stored in the ROM 902, the RAM 903, the storage device 919, or a removable recording medium 923. For example, the CPU 901 controls the overall operation of each functional unit included in the server 10 and the user terminals 20 and 30 in the embodiment. The ROM 902 stores programs including sets of instructions, calculation parameters, and the like used by the CPU 901. The RAM 903 serves as a primary storage that stores programs including sets of instructions to be used in the execution of the CPU 901, parameters that appropriately change in the execution, and the like. The CPU 901, ROM 902, and RAM 903 are interconnected to each other by the host bus 907 which may be an internal bus such as a CPU bus. Further, the host bus 907 is connected to the external bus 911 such as a PCI (Peripheral Component Interconnect/Interface) bus via the bridge 909.

The input device 915 may be a user-operated device such as a mouse, keyboard, touch panel, buttons, switches and levers, or a device that converts a physical quantity into an electric signal such as a sound sensor typified by a microphone, an acceleration sensor, a tilt sensor, an infrared sensor, a depth sensor, a temperature sensor, a humidity sensor, and the like. The input device 915 may be, for example, a remote control device utilizing infrared rays or other radio waves, or an external connection device 927 such as a mobile phone compatible with the operation of the information processing device 900. The input device 915 includes an input control circuit that generates an input signal based on the information inputted by the user or the detected physical quantity and outputs the input signal to the CPU 901. By operating the input device 915, the user inputs various data and instructs operations to the information processing device 900.

The output device 917 is a device capable of visually or audibly informing the user of the obtained information. The output device 917 may be, for example, a display such as an LCD, PDP, or OELD, etc., a sound output device such as a speaker and headphones, and a printer. The output device 917 outputs the results of processing by the information processing device 900 as text, video such as images, or sound such as audio.

The storage device 919 is a device for storing data configured as an example of a storage unit of the information processing device 900. The storage device 919 is, for example, a magnetic storage device such as a hard disk drive (HDD), a semiconductor storage device, an optical storage device, or an optical magnetic storage device. This storage device 919 stores programs executed by the CPU 901, various data, and various data obtained from external sources.

The drive 921 is a reader/writer for the removable recording medium 923 such as a magnetic disk, an optical disk, a photomagnetic disk, or a semiconductor memory, and is built in or externally attached to the information processing device 900. The drive 921 reads information recorded in the mounted removable recording medium 923 and outputs it to the RAM 903. Further, the drive 921 writes record in the attached removable recording medium 923.

The connection port 925 is a port for directly connecting a device to the information processing device 900. The connection port 925 may be, for example, a USB (Universal Serial Bus) port, an IEEE1394 port, an SCSI (Small Computer System Interface) port, or the like. Further, the connection port 925 may be an RS-232C port, an optical audio terminal, an HDMI (registered trademark) (High-Definition Multimedia Interface) port, or the like. By connecting the external connection device 927 to the connection port 925, various data can be exchanged between the information processing device 900 and the external connection device 927.

The communication device 929 is, for example, a communication interface formed of a communication device for connecting to the network NW. The communication device 929 may be, for example, a communication card for a wired or wireless LAN (Local Area Network), Bluetooth (trademark), or WUSB (Wireless USB). Further, the communication device 929 may be a router for optical communication, a router for ADSL (Asymmetric Digital Subscriber Line), a modem for various communications, or the like. The communication device 929 transmits and receives signals and the like over the Internet or to and from other communication devices using a predetermined protocol such as TCP/IP. The communication network NW connected to the communication device 929 is a network connected by wire or wirelessly, and is, for example, the Internet, home LAN, infrared communication, radio wave communication, satellite communication, or the like. The communication device 929 realizes a function as a communication unit.

The image capturing device (not shown) is, for example, a camera for capturing an image of the real space to generate the captured image. The image capturing device uses an imaging element such as a CCD (Charge Coupled Device) or CMOS (Complementary Metal Oxide Semiconductor) and various elements such as lenses that are provided to control image formation of a subject on the imaging element. The image capturing device may capture a still image or may capture a moving image.

The configuration and operation of the live-streaming system 1 in the embodiment have been described. This embodiment is merely an example, and it will be understood by those skilled in the art that various modifications are possible by combining the respective components and processes, and that such modifications are also within the scope of the present disclosure.

According to the embodiment, the joining effect is displayed upon participation of the active user in the live-stream of the streamer, but the present inventions is not limited to such. For example, an effect corresponding to the use of the out-of-stream gift may appear at any timing, such as immediately after the start of the live-stream or after a predetermined period of time has elapsed from the start. In this case, the effect may be displayed even when the giver of the out-of-stream gift is not participating in the live-stream.

Figure 20:
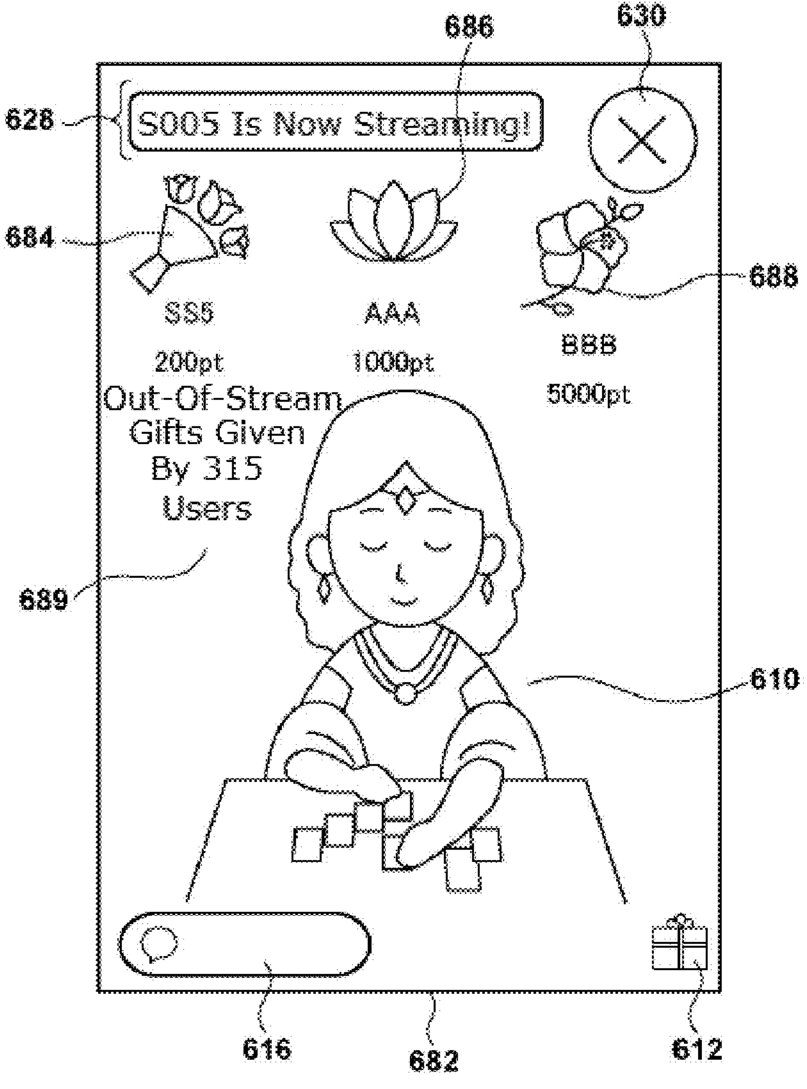
FIG. 20 is a representative screen image of a live-streaming room screen appearing on the display of a user terminal of a viewer in a modification example.

FIG. 20 is a representative screen image of a live-streaming room screen 682 shown on the display of the viewer's user terminal in a modification example. According to the modification example, at a start of a live-stream by a streamer, the live-streaming room screen 682 appears, which shows the information regarding the out-of-stream gifts given to the streamer after the last live-stream and before the current live-stream. According to the example shown in FIG. 20, the live-streaming room screen 682 has an object 684 representing an out-of-stream gift given to the streamer by a viewer "SS5", an object 686 representing an out-of-stream gift given to the streamer by a viewer "AAA", an object 688 representing an out-of-stream gift given to the streamer by a viewer "BBB", and the number of users 689 who have given the out-of-stream gifts to the streamer. In this case, the objects 684, 686 and 688 are displayed in the live-streaming room screen 682 even if the viewers "SS5", "AAA" and "BBB" are not participating in the live-stream.

The viewer-side communication unit 204 of the viewer's user terminal retrieves, from the server 10 over the network NW, the information held in the out-of-stream gift total table 334 associated with the live-stream in which the viewer is participating. Based on the retrieved information, the viewer-side UI control unit 202 displays the objects 684, 686, 688 and the number of users 689 on the live-streaming room screen 682. The objects 684, 686 and 688 respectively correspond to the first, second and third places in the rankings of the users determined by the total of price points of the out-of-stream gifts.

If the viewer taps the number of users 689 on the live-streaming room screen 682 in FIG. 20, the viewer-side UI control unit 202 performs the same series of steps as when the viewer taps the ranking object 626, which is described above, to cause the display to show the out-of-stream gift ranking screen 654.

The objects appearing as shown in FIG. 20 allow the users participating in the live-stream to know who support the streamer off-line (outside the live-stream). If any of the viewers who have given the out-of-stream gifts joins the live-stream at a later timing, the streamer can become aware of the participation through the displayed objects and directly express his/her gratitude to the viewer. Furthermore, if a large number of such objects are displayed, this may indicate that the streamer is supported by a large number of users outside the live-stream.

In the above-described modification example, the objects 684, 686 and 688 may appear at the start of the live-stream and remain displayed, or they may appear in the middle of the live-stream. Alternatively, the viewers or streamer may be allowed to determine when the objects 684, 686 and 688 appear.

The live-streaming system may be configured such that, when two streamers are live streaming simultaneously (or in parallel), viewers of one of the live-streams can send out-of-stream gifts to the streamer of the other live-stream.

In the embodiment, the users give out-of-stream gifts while viewing archived data, but the present invention is not limited to such. For example, the profile screen may be configured such that the out-of-stream gifts can be given via the profile screen. Alternatively or additionally, the out-of-stream gifts may be given via the timeline of the streamer, a chat with the streamer, a direct message to the streamer. Out-of-stream gifts refer to any gifts given by users to the streamer while the users have the live-streaming app activated but are not participating in the live-stream of the streamer. For example, while the streamer is live-streaming, the users can give out-of-stream gifts to the streamer by intentionally choosing not to participate in the live-stream.

According to the embodiment, if the total amount (or accumulated amount) of out-of-stream gifts given by a viewer to a certain streamer exceeds a threshold value, a joining effect (for example, animation indicating that the viewer joins a live-stream) appears when the viewer joins the next live-stream of the streamer. If the total amount does not exceed the threshold value, no joining effect appears. The present invention, however, is not limited to such. For example, no threshold value may be set for the total amount of out-of-stream gifts, and any viewers may be entitled to joining effects as long as they have given out-of-stream gifts. Alternatively, the same joining effect may be uniformly offered to any viewers who have given out-of-stream gifts (the same joining effect regardless of the total amount of out-of-stream gifts), and no joining effect may appear for viewers who have not given out-of-stream gifts. Alternatively, there may be two types of out-of-stream gifts: a first type that provides for joining effects; and a second type that does not. In this case, if the active user gives out-of-stream gifts of the first type to a certain streamer, joining effects appear when the active user joins the next live-stream of the streamer. If the active user gives out-of-stream gifts of the second type to a certain streamer, no joining effects appear when the active user joins the next live-stream of the streamer. This can provide for a suitable out-of-steam gift mechanism for users who want to support streamers discreetly. Alternatively, joining effects may appear depending on how many times out-of-stream gifts are given.

According to the embodiment, the out-of-stream gifts are totaled at a start of a live-stream. The present invention, however, is not limited to such. For example, when an active user joins a live-stream, out-of-streams gifts given by the active user up until the time of joining may be totaled.

According to the embodiment, the rankings are based on the total amount of out-of-stream gifts, but the present invention is not limited to such. For example, the rankings may be based on the number of times the out-of-stream gifts are given.

According to the embodiment, different joining effects appear depending on the total amount of out-of-stream gifts, but the present invention is not limited to such. For example, different joining effects may correspond to the respective types of out-of-stream gifts. Alternatively, rankings may be created based on the total amount of out-of-stream gifts, and different joining effects may be provided for the respective places.

According to the embodiment, the comment 650 is displayed with a badge and/or in a frame determined by the quantity of out-of-stream gifts used by the viewer who has entered the comment 650 for the streamer, but the present invention is not limited to such. For example, the comment 650 may be displayed with a badge and/or in a frame determined by the type of out-of-stream gifts.

According to the embodiment, once the out-of-stream gifts are given to the streamer, a corresponding reward is immediately awarded to the streamer, but the present invention is not limited to such. For example, the server 10 may be configured such that giving an out-of-stream gift does not automatically result in awarding a reward. Alternatively, the reward corresponding to the out-of-stream gift may be awarded to the streamer provided that the recipient or streamer starts live-streaming, or that the recipient or streamer starts live-streaming and the giver or active user joins the live-stream. In this case, the out-of-stream gifts may offer a higher return rate (the ratio of the reward to be awarded to the price points) for the streamer than in-stream gifts.

According to the embodiment, the joining effects are visual, but the present invention is not limited to such. For example, the joining effects may include audio or vibration, or any combination of visual, audio and vibrational effects.

The return rate of the gift, which indicates the ratio of the reward to be awarded to the price points in the embodiment is merely an example, and the return rate may be appropriately set by the administrator of the live-streaming system 1, for example.

The technical idea according to the embodiment may be applied to live commerce or virtual live-streaming using an avatar that moves in synchronization with the movement of the streamer instead of the image of the streamer.

The procedures described herein, particularly those described with a flow diagram, a flowchart, are susceptible of omission of part of the steps constituting the procedure, adding steps not explicitly included in the steps constituting the procedure, and/or reordering the steps. The procedure subjected to such omission, addition, or reordering is also included in the scope of the present disclosure unless diverged from the purport of the present invention.

At least some of the functions realized by the server 10 may be realized by a device(s) other than the server 10, for example, the user terminals 20 and 30. At least some of the functions realized by the user terminals 20 and 30 may be realized by a device(s) other than the user terminals 20 and 30, for example, the server 10. For example, the superimposition of a predetermined frame image on an image of the video data performed by the viewer's user terminal may be performed by the server 10 or may be performed by the streamer's user terminal.

What is claimed is:

1. A terminal of a streamer of a live-stream, comprising:

one or more processors; and memory storing one or more computer programs configured to be executed by the one or more processors, the one or more computer programs including instructions for:

sending, to a server over a network and while the live-stream of the streamer is being conducted, video data related to the live-stream of the streamer;

showing, while the live-stream of the streamer is being conducted, a screen of the live-stream of the streamer on a display of the terminal;

receiving, from the server over the network, an effect signal indicating a gift used for the streamer, an instruction to use the gift being received from a user before the live-stream of the streamer starts, the effect signal being generated at the server by referring to identification information of the gift and identification information of the streamer, the identification information of the gift and the identification information of the streamer being associatively stored at the server; and showing, on the screen of the live-stream of the streamer and while the live-stream of the streamer is being conducted, a visual effect corresponding to the use of the gift indicated by the effect signal received from the server.

2. The terminal of claim 1, wherein the showing the visual effect includes not showing the visual effect if a quantity or type of the gift used for the streamer before the live-stream starts does not satisfy a criterion.

3. The terminal of claim 1, wherein the visual effect depends on a quantity or type of the gift used for the streamer before the live-stream starts.

4. The terminal of claim 1, wherein the showing the visual effect includes showing the visual effect in response to participation by the user in the live-stream of the streamer.

5. The terminal of claim 1, wherein the screen has a region for showing a comment, and wherein, in the region, a comment entered by the user is displayed with an object and/or a frame determined by a quantity or type of the gift used by the user for the streamer before the streamer starts.

6. The terminal of claim 1, wherein the gift is used while the user is viewing an archived live-stream of the streamer.

7. The terminal of claim 1, wherein the one or more computer programs further include instructions for showing rankings on the display during the live-stream of the streamer, the rankings being based on an amount of gifts used or the number of times gifts are used by users for the streamer before the live-stream of the streamer starts.

8. A method for a terminal of a streamer of a live-stream, including:

sending, to a server over a network and while the live-stream of the streamer is being conducted, video data related to the live-stream of the streamer;

showing, while the live-stream of the streamer is being conducted, a screen of the live-stream of the streamer on a display of the terminal;

receiving, from the server over the network, an effect signal indicating a gift used for the streamer, an instruction to use the gift being received from a user before the live-stream of the streamer starts, the effect signal being generated at the server by referring to identification information of the gift and identification information of the streamer, the identification information of the gift and the identification information of the streamer being associatively stored at the server; and showing, on the screen of the live-stream of the streamer and while the live-stream of the streamer is being conducted, a visual effect corresponding to the use of the gift indicated by the effect signal received from the server.

9. The method of claim 8, wherein the showing the visual effect includes not showing the visual effect if a quantity or type of the gift used for the streamer before the live-stream starts does not satisfy a criterion.

10. The method of claim 8, wherein the visual effect depends on a quantity or type of the gift used for the streamer before the live-stream starts.

11. The method of claim 8, wherein the showing the visual effect includes showing the visual effect in response to participation by the user in the live-stream of the streamer.

12. The method of claim 8, wherein the screen has a region for showing a comment, and wherein, in the region, a comment entered by the user is displayed with an object and/or a frame determined by a quantity or type of the gift used by the user for the streamer before the streamer starts.

13. The method of claim 8, wherein the gift is used while the user is viewing an archived live-stream of the streamer.

14. The method of claim 8, further includes showing rankings on the display during the live-stream of the streamer, the rankings being based on an amount of gifts used or the number of times gifts are used by users for the streamer before the live-stream of the streamer starts.

* * * * *